March 9, 1965 D. M. BARRETT ETAL 3,173,008
SPOT FILMER
Filed Dec. 28, 1961 22 Sheets-Sheet 1

INVENTORS
DAVID M. BARRETT,
EDGAR J. BASTIN,
CHARLES R. HEHMEYER &
MICHAEL HURA

BY

ATTORNEYS

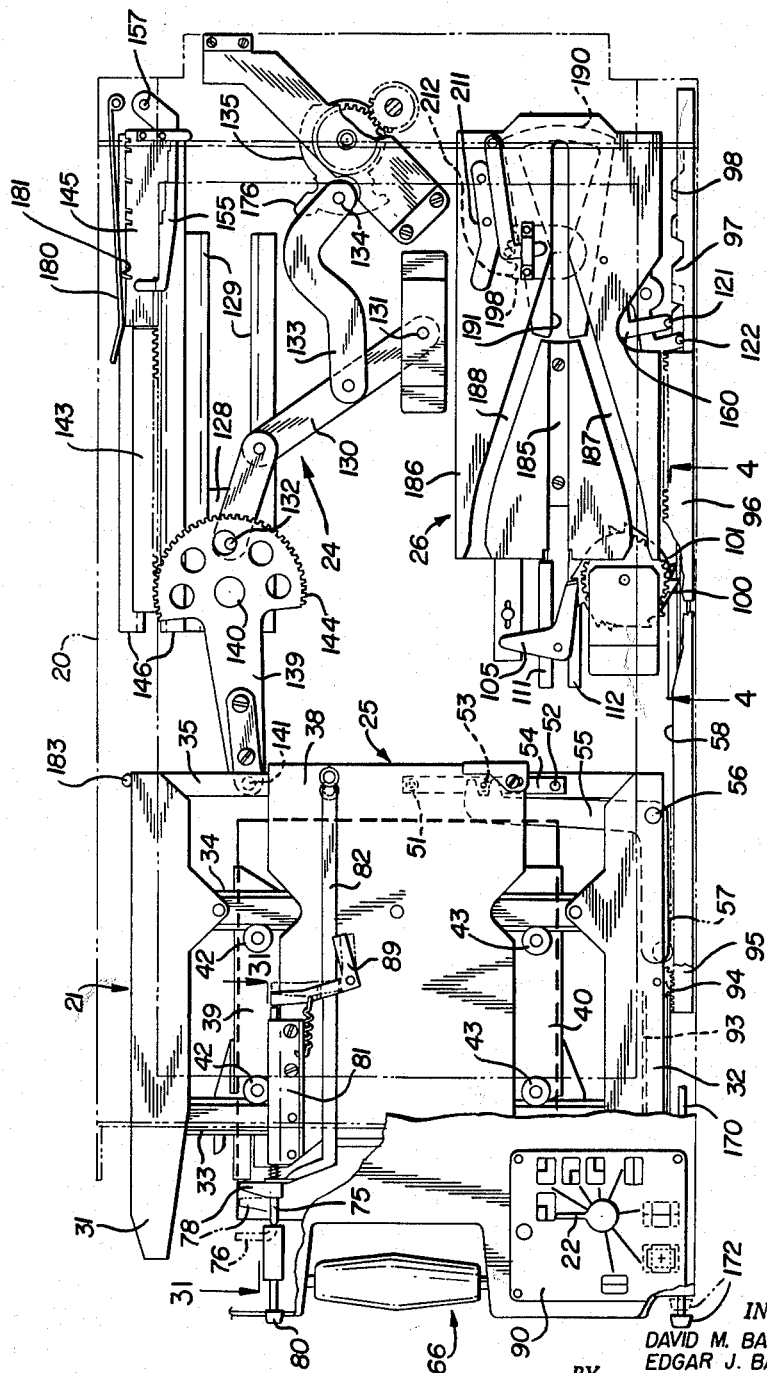

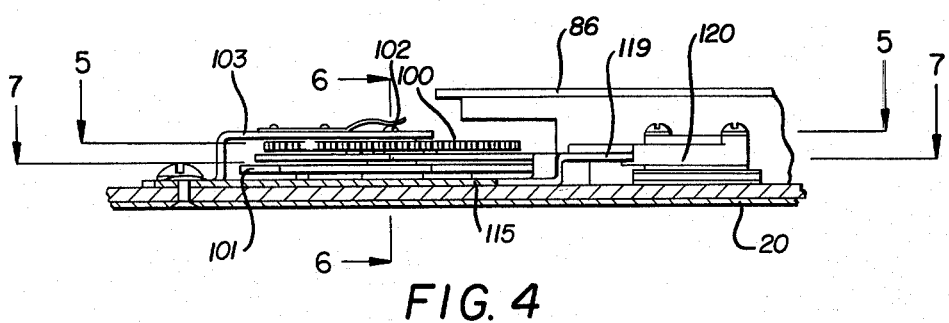
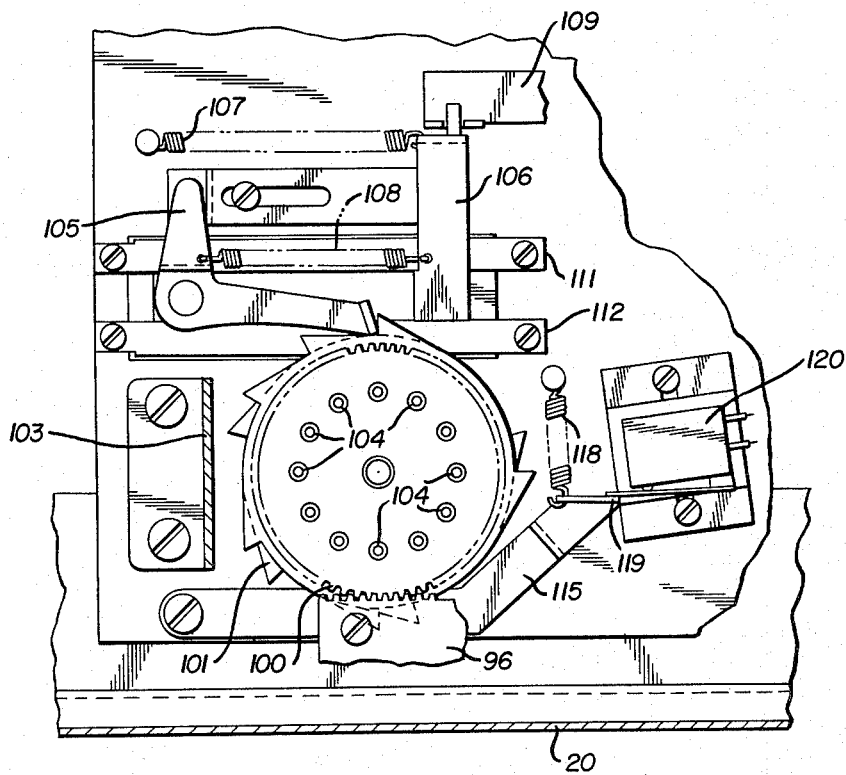

March 9, 1965 D. M. BARRETT ETAL 3,173,008
SPOT FILMER
Filed Dec. 28, 1961 22 Sheets-Sheet 4

INVENTORS
DAVID M. BARRETT,
EDGAR J. BASTIN,
BY CHARLES R. HEHMEYER &
MICHAEL HURA

ATTORNEYS

March 9, 1965  D. M. BARRETT ETAL  3,173,008
SPOT FILMER
Filed Dec. 28, 1961  22 Sheets-Sheet 7
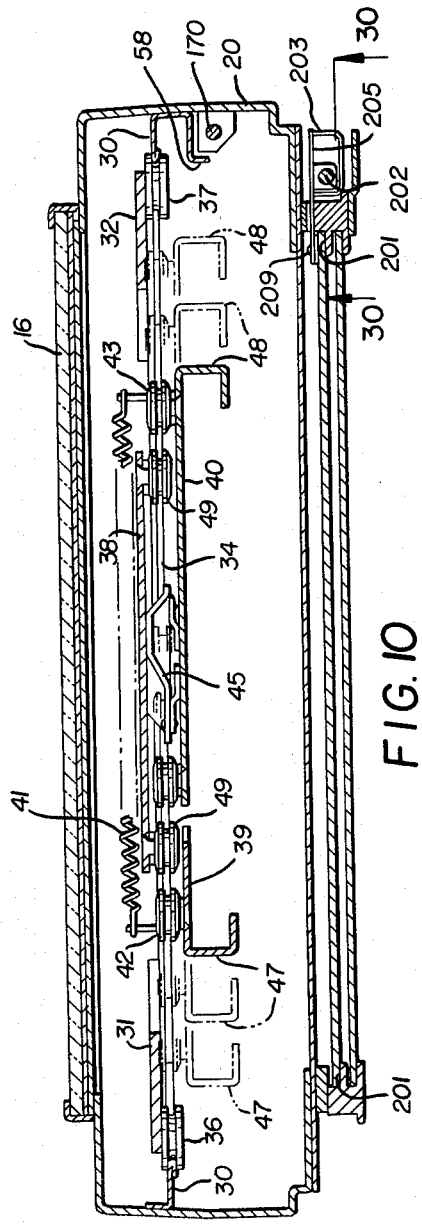
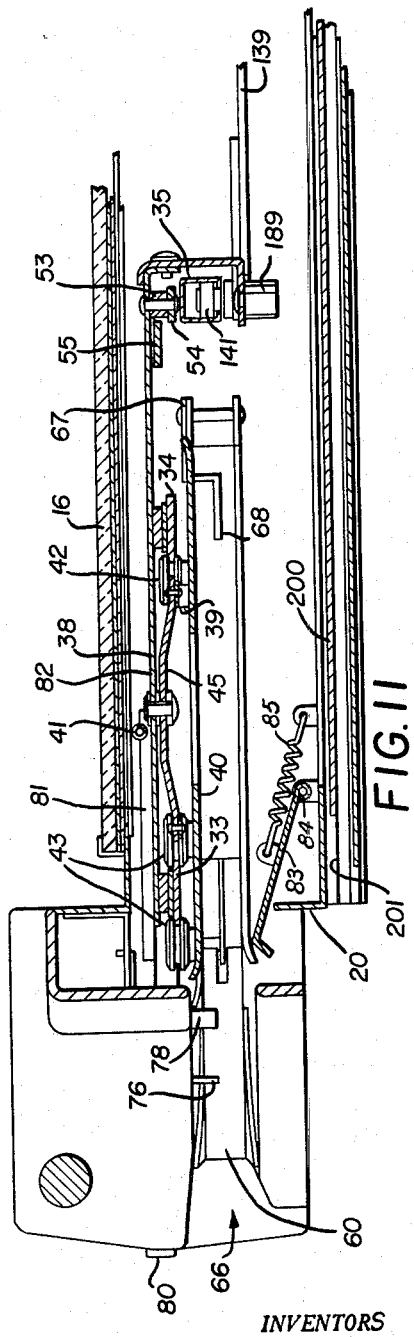
INVENTORS
DAVID M. BARRETT,
EDGAR J. BASTIN,
CHARLES R. HEHMEYER &
MICHAEL HURA
BY
ATTORNEYS March 9, 1965  D. M. BARRETT ETAL  3,173,008
SPOT FILMER
Filed Dec. 28, 1961  22 Sheets-Sheet 8

INVENTORS
DAVID M. BARRETT,
EDGAR J. BASTIN,
BY  CHARLES R. HEHMEYER &
MICHAEL HURA

ATTORNEYS

INVENTORS
DAVID M. BARRETT,
EDGAR J. BASTIN,
CHARLES R. HEHMEYER &
MICHAEL HURA
BY
ATTORNEYS

March 9, 1965 D. M. BARRETT ETAL 3,173,008
SPOT FILMER
Filed Dec. 28, 1961 22 Sheets-Sheet 13

INVENTORS
DAVID M. BARRETT,
EDGAR J. BASTIN,
BY CHARLES R. HEHMEYER &
MICHAEL HURA

ATTORNEYS

INVENTORS
DAVID M. BARRETT,
EDGAR J. BASTIN,
CHARLES R. HEHMEYER &
MICHAEL HURA
BY
ATTORNEYS

March 9, 1965  D. M. BARRETT ETAL  3,173,008
SPOT FILMER
Filed Dec. 28, 1961  22 Sheets-Sheet 19

INVENTORS
DAVID M. BARRETT,
EDGAR J. BASTIN,
CHARLES R. HEHMEYER &
MICHAEL HURA
BY  Watts and Fisher
ATTORNEYS March 9, 1965 D. M. BARRETT ETAL 3,173,008
SPOT FILMER
Filed Dec. 28, 1961 22 Sheets-Sheet 22

INVENTORS
DAVID M. BARRETT,
EDGAR J. BASTIN,
BY CHARLES R. HEHMEYER &
MICHAEL HURA

ATTORNEYS

3,173,008
SPOT FILMER

David M. Barrett, Lyndhurst, Edgar J. Bastin, Chesterland, Charles R. Hehmeyer, Willoughby, and Michael Hura, Cleveland, Ohio, assignors to Picker X-Ray Corporation, Waite Manufacturing Division, Inc., Cleveland, Ohio, a corporation of Ohio
Filed Dec. 28, 1961, Ser. No. 165,709
27 Claims. (Cl. 250—66)

This invention pertains to medical X-ray apparatus and more specifically to that class of radiographic devices which are now known in the art as spot filmers.

A medical X-ray table is generally equipped with a device known as a spot filmer. These spot filmers include a fluoroscopic screen, or in the alternative, an image intensification tube and an associated optical system or closed circuit television arrangement. A spot filmer also includes a mechanism for selectively and sequentially positioning a photographic film carried in a film cassette for a series of radiographic exposures.

In one class of spot filmer, a motor driven carriage is provided which selectively advances a cassette to a radiographic position, and thereafter moves a cassette through a predetermined sequence of positions. One mechanism of this class is described in United States Letters Patent 2,668,913, issued February 9, 1954, under the title, "X-ray Apparatus," while a more recent design is described and claimed in United States Letters Patent 2,767,323 issued October 16, 1956, under the title, "X-ray Grid Actuating Device." This invention is directed to an improved spot filmer which has certain definite advantages over those described and claimed in these two patents.

One of the disadvantages of the spot filmers described and claimed in these two patents is that they are of the so-called "top" loading type. That is, a cassette when positioned in the carriage is inserted through a loading aperture in the top of the spot filmer. This loading aperture in most spot filmers of the so-called "top" loading type is toward the rear of the housing. When an image intensification tube is secured to the spot filmer loading becomes quite difficult and awkward since the operator must reach around the tube and over the table and patient to position the cassette.

With this invention, a spot filmer of the so-called "front" loading class is provided. In the mechanism of this invention loading—and unloading—of a cassette into the cassette carriage is accomplished through a simple, direct, rectilinear movement through a loading aperture in the forward end of the spot filmer. Loading only requires inward pressure until the cassette is in place when it locks automatically while simply pressing a button results in automatic ejection of the cassette.

A novel cassette gripping mechanism wherein a cross carriage is mounted on the carriage and equipped with two relatively movable jaws is provided. The jaws are biased together and controlled so that their movement is at all times equal and opposite. When a cassette is inserted in the carriage, it is passed through the front load opening and inserted into the jaws which automatically move away from one another until they are spaced from one another the width of the cassette. The cassette is slid into supports on the jaws which resiliently grip the cassette. Accordingly, a novel and improved cassette-retaining mechanism is provided which will accept a cassette of any width between maximum and minimum limits.

Another feature of the invention is that combination radiation shield and cassette stop is provided which prevents insertion of a cassette through the front load opening at any time except when a carriage is positioned adjacent the load opening. At other times, this shield provides a scatter radiation shield to protect the operator from stray radiation emanating from the front load opening.

According to another feature of the invention an interlock arrangement is provided through which jams and damage from attempts to retract the carriage with an improperly positioned cassette are prevented. The interlock arrangement provided makes it impossible to retract the carriage from its load position unless there is either no cassette in the carriage or the cassette is properly positioned in the carriage.

A drive mechanism is provided which automatically shifts the carriage through a preselected sequence of radiographic exposures, one exposure at a time, each time an actuation button is depressed. The mechanism is designed so that a slide is driven by an eccentric to provide a predetermined amount of forward carriage travel on each advance of the carriage. This predetermined amount of travel is obtained through a crank action so that it initiates with a low forward speed, accelerates rapidly and then decelerates rapidly.

In addition, the slide drives a travel control arm which selectively rotates predetermined amounts from a minimum to a maximum according to the amount of forward carriage travel which is desired. Since the travel arm rotates a further eccentric-like action is obtained wherein the relative movement of the carriage to the slide is with a smooth acceleration to a maximum and thereafter a decrease. This carriage movement, obtained by rotation of the crank arm is additive to the movement obtained by the slide action and accordingly, then, two eccentric-like actions occur essentially simultaneously to provide the required acceleration and deceleration. Further the time required for movement from the park position to any exposure position is substantially equal to the time required to move to any other exposure position or to the unload position. This not only provides a high speed device but also a device in which synchronization of a timed exposure is facilitated.

Another of the advantages of the invention resides in a cross travel movement for longitudinally dividing a positioned film into halves. This cross travel movement occurs during certain sequences but is prevented by an interlock arrangement whenever a cassette of a width too large for such cross travel is in the carriage.

Lights which indicate to the operator when the device is in the load position and indicate when the device either requires unloading or resetting of the position control mechanism are another feature of the mechanism. A double-exposure switch which energizes one of these lights not only prevents double exposures but also prevents commencement of an exposure sequence until the sequence control mechanism has been set for a desired sequence.

An arrangement wherein the position control mechanism is disengaged at the time when the carriage is in a park position provides another feature in that this both facilitates manual setting of the mechanism for a given exposure sequence and minimizes noise during such selection and during the automatic indexing of the mechanism.

Another feature of the invention resides in a lock arrangement wherein the cross carriage is automatically locked after it has indexed into a selected position.

An additional feature of the invention resides in an arrangement where an accidental bumping of the eject switch will not cause the mechanism to run through an eject cycle but rather the eject switch must be pressed and held to effect an ejection of a cassette.

Another feature of the invention is that once the carriage is in the load position it will stay there until properly loaded or fully unloaded and the eject switch is pressed. At all other times, the carriage automatically travels to a park position unless either the eject button or the exposure button is pressed and held. Further, if both are pressed and held at the same time, the eject circuit will override the exposure circuit; but if the eject button is accidentally struck while an exposure is in progress it cannot cause the mechanism to move.

Yet another feature of the invention resides in a novel and improved drive mechanism for a Bucky grid which permits facile parking of the grid and movement into position for radiography.

An outstanding feature of the device is an arrangement wherein the mechanism may be moved to the load-unload position at any time it is in the park position irrespective of the setting of the position control mechanism.

Other features and a fuller understanding of the invention may be had by referring to the following description and claims taken in conjunction with the accompanying drawings, in which:

In the drawings:

FIGURE 3 is a sectional view of the spot filmer device in the loading position as seen from the plane indicated by the line 3—3 of FIGURE 1 and on an enlarged scale with respect to FIGURE 1 and a reduced scale with respect to FIGURE 2;

FIGURE 4 is a sectional view of the sequence-indexing mechanism as seen from the plane indicated by the line 4—4 of FIGURE 3 and on an enlarged scale with respect to FIGURE 3;

FIGURES 5–7 are sectional views of the indexing mechanism of this invention as seen respectively from the planes indicated by the lines 5—5, 6—6, and 7—7 of FIGURE 4 and each on the scale of FIGURE 4;

Figure 8:
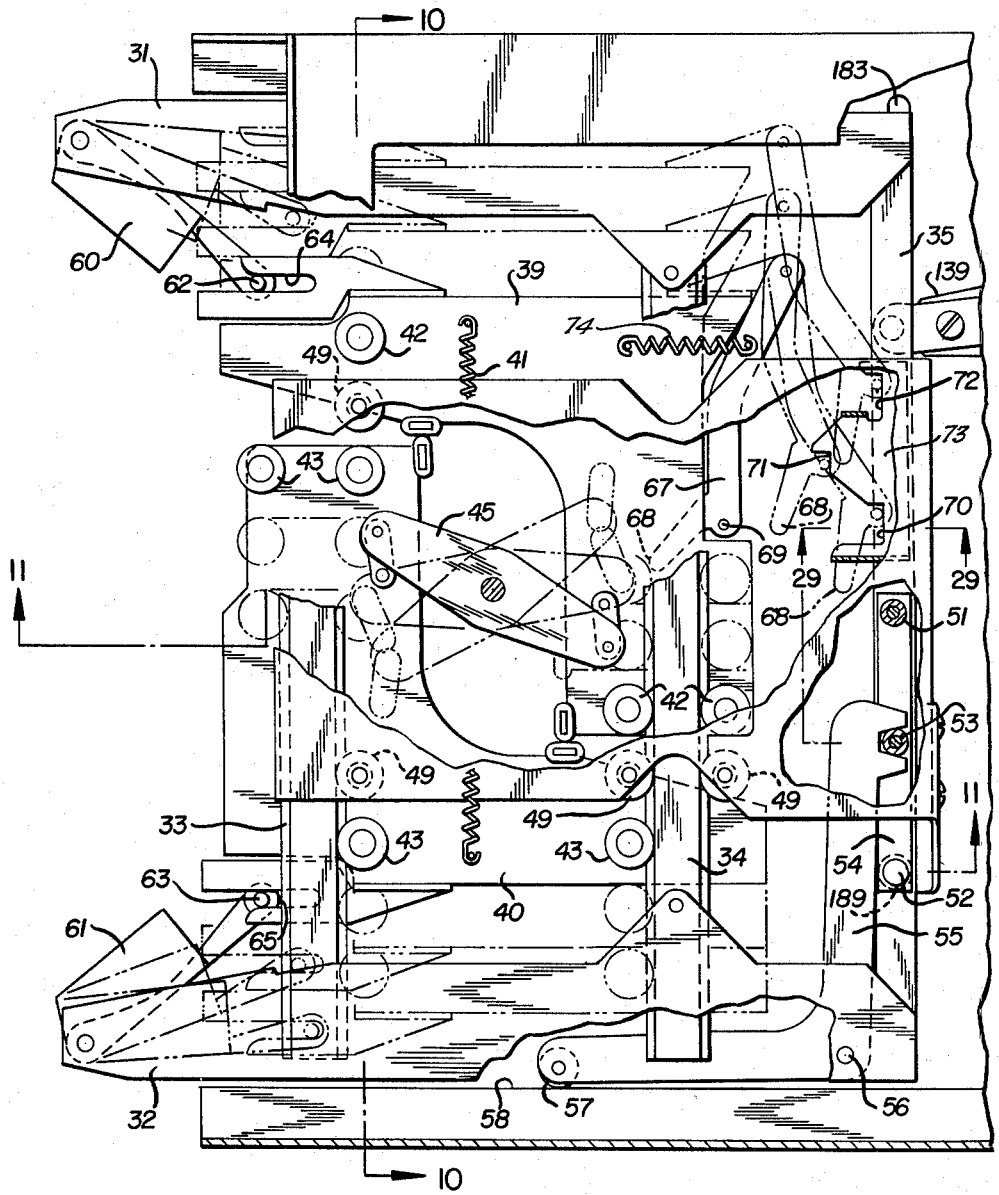
FIGURE 8 is an enlarged sectional view in the plane of FIGURE 3 of the forward end of the spot filmer showing the casette carriage in detail and in the loading and unloading position and with parts broken away and removed.
Figure 9:
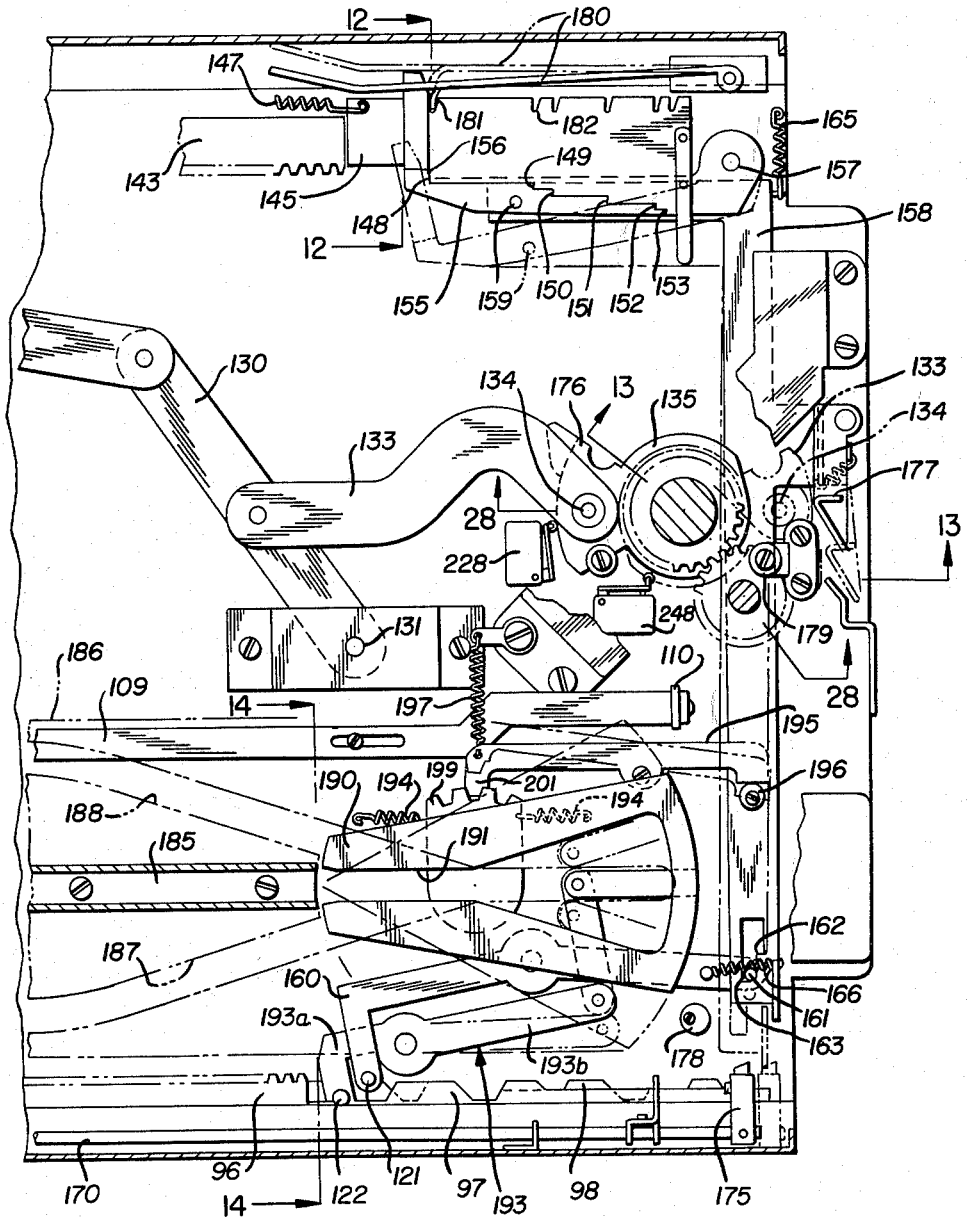
FIGURE 9 is an enlarged sectional view of the device on the scale of FIGURE 8 and showing the rearward end of the spot filmer as seen from the plane of FIGURE 3.
Figure 12:
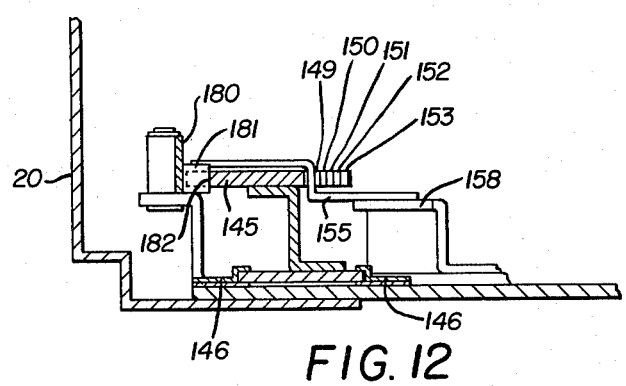
Figure 13:
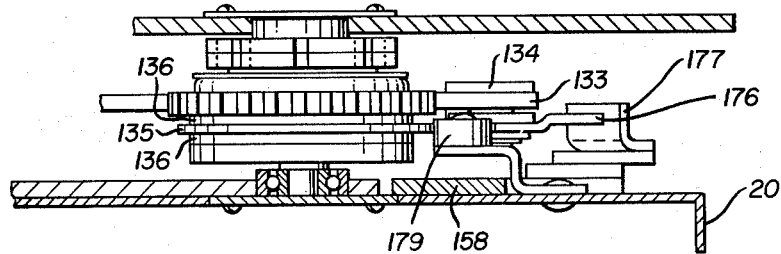
Figure 14:
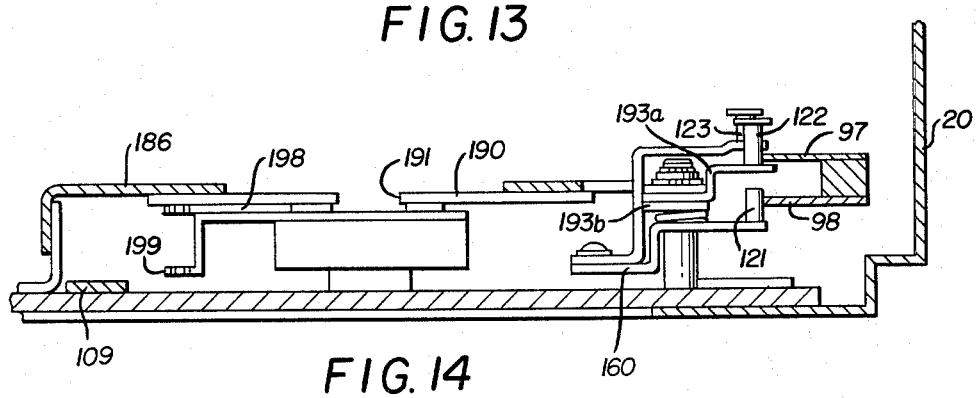
Figure 27:
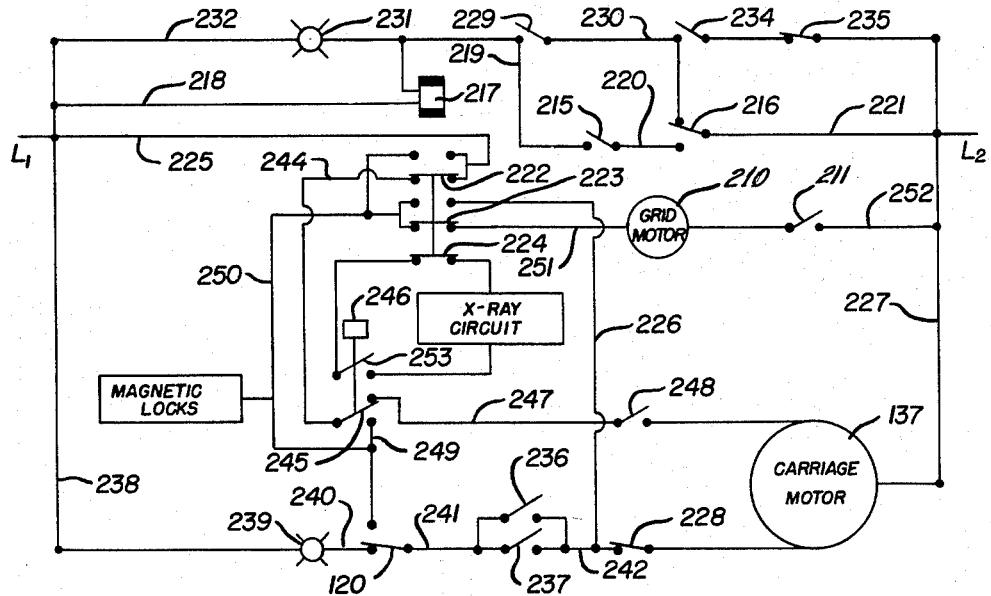
Figure 28:
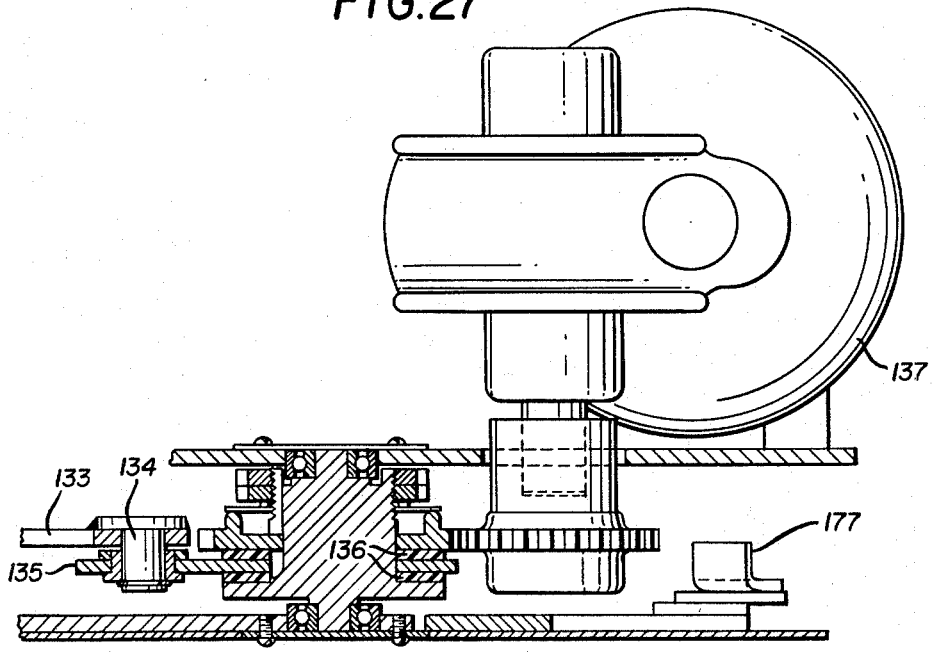
Figure 29:
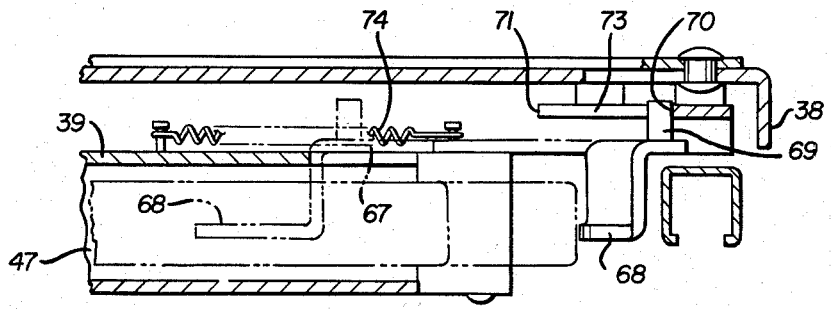
Figure 30:
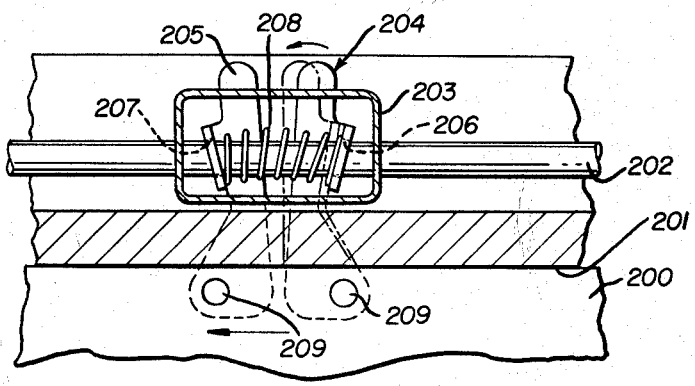
Figure 31:
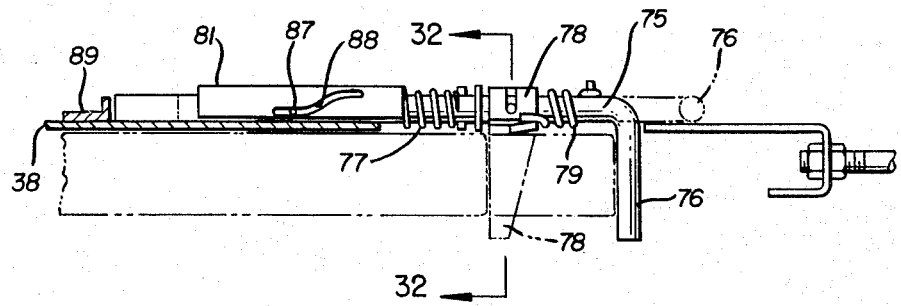
Figure 32:
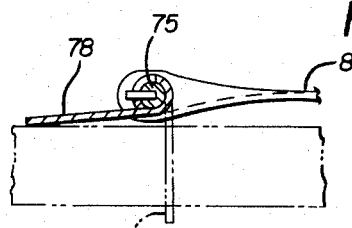

FIGURES 10 and 11 are sectional views of the devices as seen respectively from the planes indicated by the lines 10—10 and 11—11 of FIGURE 8;

FIGURES 12—14 are sectional views as seen respectively from the planes indicated by the lines 12—12, 13—13 and 14—14 of FIGURE 9; and, FIGURES 15—26 are views corresponding to FIGURE 3 showing the carriage in each of its selectively obtained positions;

FIGURE 27 is a circuit diagram showing the electrical control circuits;

FIGURE 28 is a sectional view of the drive mechanism as seen from the plane indicated by the line 28—28 of FIGURE 9;

FIGURE 29 is a sectional view on an enlarged scale of the cassette restraining mechanism as seen from the plane indicated by the line 29—29 of FIGURE 8;

FIGURE 30 is a sectional view on an enlarged scale of the reciprocating grid drive mechanism as seen from the plane indicated by the line 30—30 of FIGURE 10;

FIGURE 31 is an enlarged sectional view in the cassette lock as seen from the plane indicated by the line 31—31 of FIGURE 3; and, FIGURE 32 is a sectional view as seen from the plane indicated by the line 32—32 of FIGURE 31.

Figure 1:
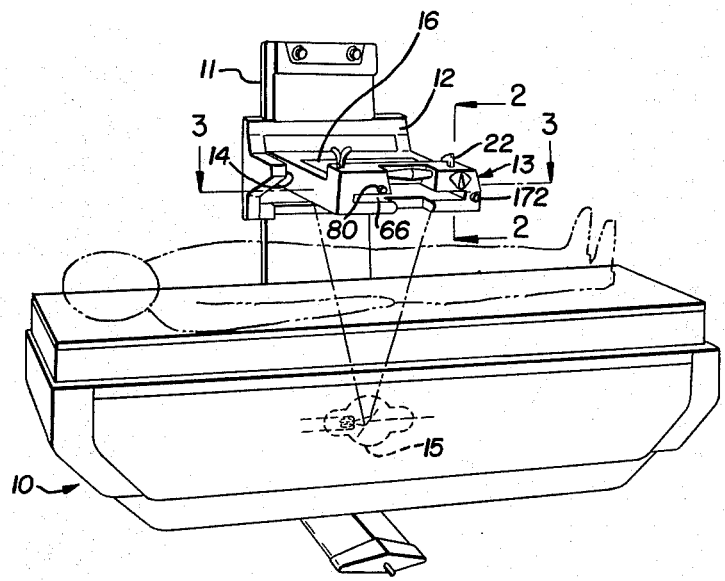
FIGURE 1 is a perspective view of an X-ray table including the spot filmer of this invention.

Referring now to the drawings and to FIGURE 1 in particular, an X-ray table is shown generally at 10. The table is preferably one of the usual and well-known types of tiltable tables. The table 10 has the usual fluoroscopic column 11 which is movably mounted in the body of the table 10 for rectilinear movement paralleling the table top and both transversely and longitudinally with respect to the top. A fluoroscopic carriage 12 is mounted on the column 11 for rectilinear movement toward and away from the body of the table 10. A spot film device 13 is mounted on the carriage 12 for movement with it. Additionally, the spot filmer 13 is pivotal about pivots 14 from the operation position shown in FIGURE 1, to a park position.

An X-ray tube 15 is carried by the column 11 and positioned within the body of the table 10. The tube 15 is positioned to selectively emit a conical-like beam of X-rays to stimulate selectively either a fluoroscopic screen 16, FIGURE 2, or a photographic film.

Figure 15:
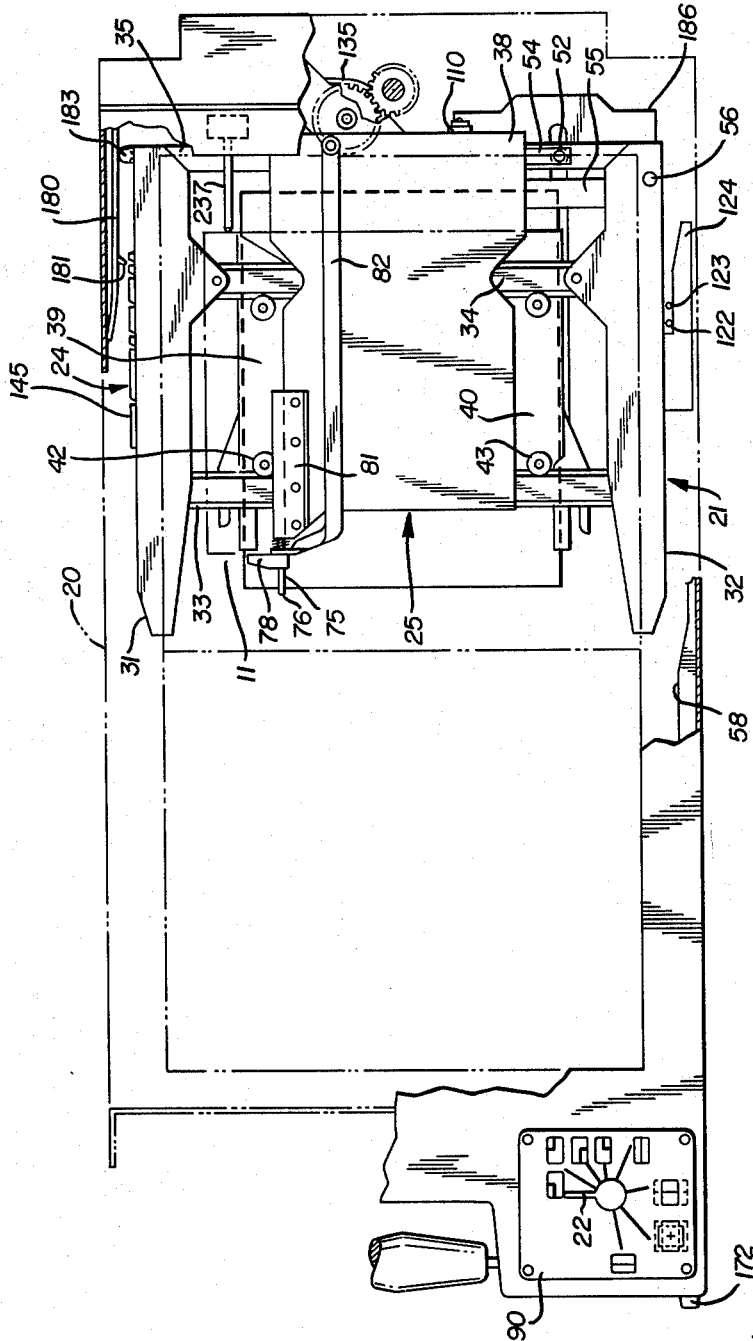

Referring now to FIGURE 3, a spot filmer frame is shown generally at 20. A cassette carriage shown generally at 21 is mounted in the frame for rectilinear movement from a loading and unloading position of FIGURE 3 near the front of the spot filmer. The carriage 21 in its loading position is shown at the left in FIGURE 3. The carriage is movable from the loading position to a storage position at the rear of the spot filmer. This storage position is depicted in FIGURE 15 where the rear of the device is at the right. The carriage 21 is advanced selectively and sequentially from the storage position to each exposure position of a selected series.

When a selector knob 22 is placed in the position of FIGURES 3 and 15 and thereafter the mechanism is repeatedly actuated four times, the carriage will selectively travel to the positions of FIGURES 16–19 in the numbered order. These four positions provide selective exposure, one at a time, of each of the four quadrants of a photographic film carried by the carriage 21. These four quadrants are indicated by rectangles of dotted lines in FIGURES 16–19, each of which indicates a radiographic exposure which will be made in a given position. When the selector knob 22 is positioned in the position of FIGURE 20, the carriage 21 will move sequentially from the storage position of FIGURE 15 to the positions of FIGURE 20, and then 21 for exposing the forward and rearward halves of one size of film, the areas of which are "similar to the other of FIGURES 16–26" designated by dotted rectangles. When the selector knob 22 is positioned in the position of FIGURE 22, the carriage 21 moves sequentially and selectively from the position of FIGURE 2 to the positions of FIGURES 22 and 23, halving the film along a longitudinal centerline. The position of the selector knob 22 in FIGURE 24 produces a full film exposure position of FIGURE 24, while the position of the selector knob 22 in FIGURE 25 produces the forward and rearward halves of the film depicted in FIGURES 25, 26 which is of a different size than the film of FIGURES 20 and 21.

Referring again to FIGURE 3, the forward and rearward travel of the carriage 21 is controlled by a longitudinal travel producing assembly shown generally at 24. The longitudinal travel assembly 24 is in the upper right of FIGURE 3. Cross movement of a cross carriage 25 mounted on the carriage 21 is obtained through a cross movement control assembly 26 which is in the lower right-hand corner of FIGURE 3. The details of construction of four mechanical subassemblies will be described below under separate headings.

These four subassemblies are:
(1) The carriage 21;
(2) The position control assembly connected to the selector knob 22;
(3) The longitudinal travel assembly 24; and
(4) The cross travel assembly 26.

Another section will define the operation of a reciprocating grid, while an electrical control circuit and its operation will be described in a sixth section. Finally, a description of the operation of the device will follow the four sections describing the mechanical subassemblies, the section defining the grid operation, and the electrical control circuit.

THE CARRIAGE

The structure of the carriage is shown with the most detail in FIGURES 3, 8, 10, and 11. In FIGURE 10, a pair of longitudinal guide tracks 30 are visible. These guide tracks 30 are secured to the sides of the frame 20 and provide a track for the rectilinear movement of the carriage 21 from its storage position, FIGURE 15, to its load and unload position, FIGURE 3, and to its intermediate positions which are exposure positions.

The carriage 21 has a frame comprised of a pair of frame side members 31, 32, a pair of frame cross track members 33, 34, and a slide cross member 35. Carriage supporting wheels 36, 37 are journaled respectively on the carriage frame side members 31, 32. The carriage supporting wheels 36, 37 engage the longitudinal guide tracks 30 for supporting the carriage 21 during its rectilinear movement. One of each of the wheels 36, 37 is visible in FIGURE 10, it being understood that there are at least two of each.

The cross carriage 25 is mounted on the carriage 21 for transverse or cross travel. The cross carriage 25 includes a top plate 38 and a pair of movable jaws 39, 40 which are of generally L-shape when viewed from the top as in FIGURE 8. The jaws 39, 40 are respectively mounted for rectilinear cross travel on the cross tracks 33, 34, by wheels 42, 43 and are urged toward one another by a spring 41, FIGURE 10, secured to them. When there is no cassette in the carriage the jaws are urged into abutment by the spring 41.

A jaw coordinating link 45 is pivotally connected to the top plate 38 along the longitudinal centerline of the plate. The jaw coordinating link 45 is also pivotally connected to both of the movable jaws 39, 40. The jaw coordinating link 45 serves to maintain the jaws 39, 40 equal distance from either side of this longitudinal centerline.

The jaws each have downwardly extending cassette-gripping flanges 47, 48 on the jaws 39, 40. These flanges serve to support a cassette when it is positioned in the carriage. In order to assure proper positioning of the cassette in each of the positions of the device, it is important to have the cassette-supporting flanges 47, 48 symmetrical about the longitudinal centerline of the cross carriage. From the preceding description, it will be apparent that the jaw coordinating link 45 serves to maintain the cassette supporting flanges 47, 48 equidistant from the cross carriage centerline plane at all times so as to properly locate a cassette, transversely speaking, in the cross carriage.

The top plate 38 has wheels 49 journaled on it, FIGURE 10. These wheels 49, like the wheels 42, 43, engage the cross track members 33, 34. The wheels 42, 43, 49 support the cross carriage 25 for cross travel on the carriage 21. Thus, the jaws 39, 40 move, upon loading or unloading of a cassette, relative to one another and relative to the top plate 38. At other times, during the operation of the device as will be explained in greater detail below, the entire cross carriage 25, moves as a unit, relative to the carriage 21 laterally along the cross tracks 33, 34.

The cross carriage 25 has three operative positions, relative to the carriage 21. When viewing the device from the front, these may be referred to as left, right and center positions. This would be the movement to the left, right and center respectively in FIGURE 10 or movement to the top, bottom and center respectively in FIGURES 3 and 8.

Left, right and center lock pins 51, 52, 53 are provided. These pins are secured to the top plate 38 in fixed relative positions immediately above the slide cross member 35. The left and center lock pins 51, 53 rivet a lock pin support 54 to the top plate 38. The right-hand lock pin 52, on the other hand, is simply an upstanding pin on the lock pin support 54 as can be seen in FIGURE 3.

A generally L-shaped cross travel position lock 55 is pivotally mounted at 56 on the right side guide 32, FIGURE 8. An examination of FIGURE 8 will show that the pivot 56 is immediately forward of the cross member 35. The lock 55 selectively engages the lock pins 51, 52, and 53 one at a time. FIGURES 3 and 10 show the lock bar in engagement with the central lock pin 53 to lock the cross carriage 25 in its central position.

A roller 57 on the forward end of the lock bar 55 rides on a side cam 58 provided along the right side of the spot filmer frame 20. Coaction of the roller 57 and the cam 58 maintains the lock bar in a position to engage an appropriate one of the lock pins. As will become apparent from an examination of FIGURE 15, the cam 58 permits the lock bar 55 to pivot out of engagement with the lock pins under the urging of a spring (not shown) whenever the carriage is moved to the rearward portion of the spot filmer. In a manner which will be described below, the cross carriage is shifted laterally to the right or to the left as the cassette carriage advances from its storage position of FIGURE 15. At such times the cross travel position lock will be pivoted into engagement with the appropriate one of the left and right lock pins 51, 52.

A pair of cassette guide chutes 60, 61 are provided on the forward end of the carriage 21. These chutes are visible in FIGURE 8 where it will be seen that they are pivotally connected respectively to the forward ends of the frame side members 31, 32. A side elevational view of the chute 60 is visible in FIGURE 11 and the chute 61 is a mirror image of the chute 60. Each is sized for guiding sliding engagement with a cassette upon insertion of a cassette into the carriage.

Jaw actuation pins 62, 63 are secured respectively to the rearward portions of the chutes 60, 61. The jaw actuation pins extend upwardly from their respective rearward positions. These pins 62, 63 are respectively disposed for sliding rectilinear actuating movement in elongated jaw actuation slots 64, 65 formed in the forward ends of the jaws 39, 40. Whenever a cassette is passed through a front loading opening 66 in the spot filmer, FIGURE 11, into the chutes 60, 61 the action of the cassettes against the chutes will cause the chutes to pivot outwardly. This outward chute movement moves the jaws outwardly an appropriate amount to receive the cassette being loaded.

As suggested above, the action of the jaw coordinating bar 45 will limit the travel of the jaws 39, 40 in a manner to cause equal and opposite travel thereby automatically laterally centering an inserted cassette. The jaws 60, 61 guide the cassette into the cassette supporting flanges 47, 48 such that the cassette is supported vertically and at the same time gripped on its sides by the flanges through the action of the spring 41 pulling the jaws toward one another.

A cassette insertion travel limiter 67 is provided. This travel limiter is an arm which is pivotally mounted near the rearward end of the movable jaw 39 toward the top portion of FIGURE 8 where it is visible. The cassette travel limiter 67 includes a downwardly extending cassette engaging portion 68 which will abut the rearward edge of an inserted cassette. As the cassette moves rearwardly, it will force the engaging projection 68 to move rearwardly with it until a stop pin 69 acts to prevent further rearward movement of the cassette. This stop pin projects upwardly from the travel limiter 67. The stop pin 69 engages an appropriate one of three stop notches 70, 71, 72 on a cassette travel stop plate 73 which is secured to the top plate 38.

A spring 74 is provided to normally bias the travel limiter 67 into its forward position shown in solid lines in FIGURE 8. Comercially available cassettes are referred to as 8" x 10" and 10" x 12" because of the film sizes they accommodate. They will be so designated here even though in reality they are somewhat larger. Depending on size and position of a cassette, the travel limiter 67 will assume a position relative to the jaw 39 corresponding to one of the three shown phantom positions in FIGURE 10, when it is in engagement with an appropriate one of the stops 70, 71, 72. That is, the travel limiter moves rearwardly relative to the jaw 39 enough to accommodate a cassette having a dimension, measured longitudinally of the spot filmer, of either of two amounts. The travel limiter will move laterally with the jaw to accommodate any of three transverse dimensions. With an 8" x 10" cassette positioned with the 8" dimension transversely in the housing, the pin 69 will engage the stop 70. When the 8" x 10" cassette is positioned the other way the pin 69 will engage the stop 71 and the pin will engage the stop 72 when a 10" x 12" cassette is in the carrier.

Once rearward travel of the cassette has been arrested by the travel limiter 67, some means must be provided to retain the cassette in its appropriate and inserted position, since, after all, the spring 74 biasing the travel limiter 67 forwardly will also serve to shift the cassette forwardly and eject the cassette. In fact, the cassette arrestor 67— as will become apparent during the discussion of the operation of the device—also serves as a cassette ejector at an appropriate time in the cycle.

Figure 16:
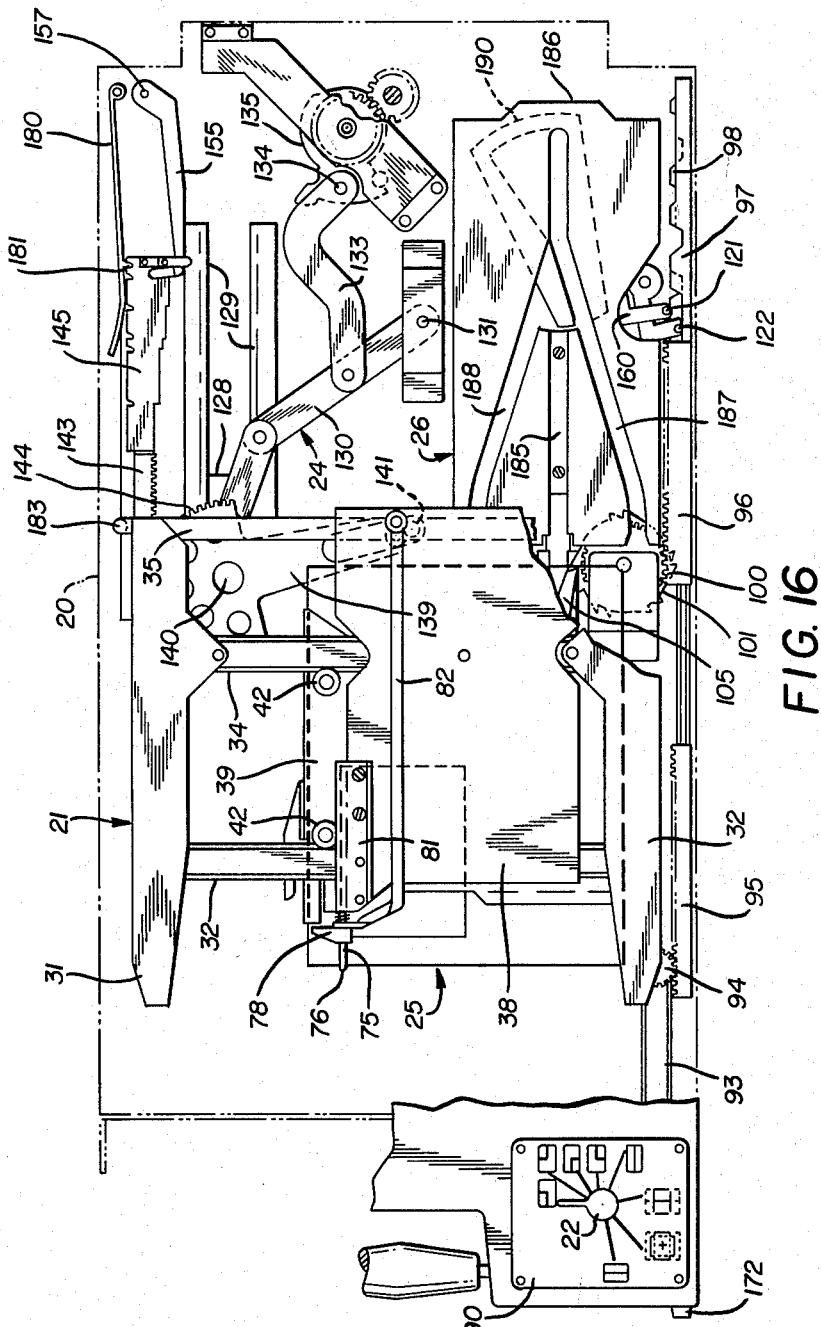
Figure 17:
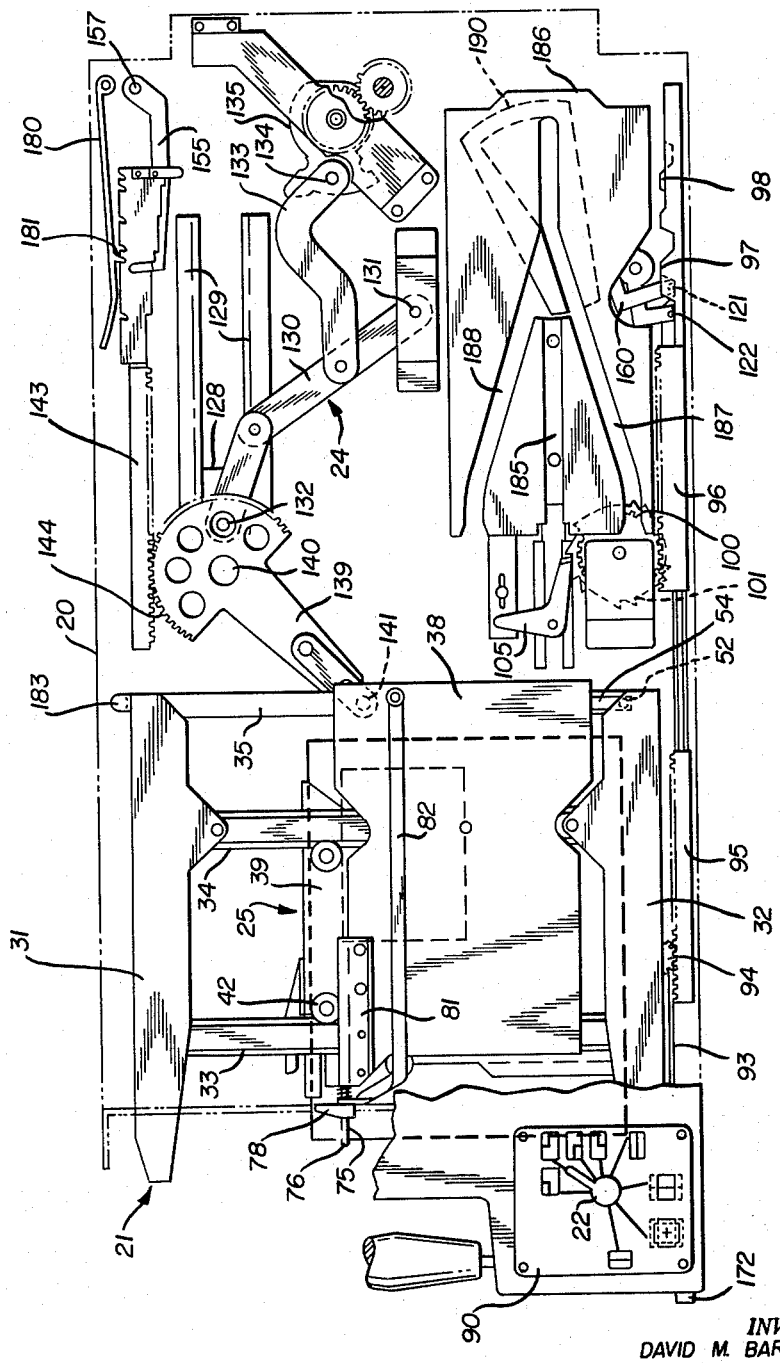

The means to maintain the cassette in its indexed position wil best be understood by reference to FIGURES 3, 31, and 32. A cassette lock bar 75 is rotatably and slidably mounted on the top plate 38. The bar 75 includes a large-size cassette retainer 76 which preferably is simply the end portion of the bar 75 bent at right angles with the remainder of the bar. Spring 77 is wound around the bar 75 biasing the bar outwardly and rotatably to the position shown in FIGURE 3. A lock trip 82 is slidably mounted on the top plate 38. The trip includes a downwardly extended rearward projection which overlies the inner end of an inserted cassette. When a cassette is inserted it forces the trip rearwardly which in turn moves the cassette bar 75 rearwardly. A pin 87 on the bar 75 and a groove 88 in a bar support 81, FIGURE 31, cause relative rotation and cause the bar to shift to its lock position with the end portion 76 in the vertical position shown in each of FIGURES 16–23. A spring biased lock holder 89 engages a coacting notch on the lock trip 82 to hold it in a locked position, FIGURE 3. When an 8" x 10" cassette is positioned with its 8" dimension longitudinally, a shorter cassette retainer 78 maintains the cassette in its loaded position. At such time, the projection 78 is biased into a vertical position by a projection spring 79. This vertical position is visible in FIGURE 11. At all times when a cassette having a longitudinal dimension of a larger size; i.e., 10 inches, is in the carrier, the smaller size cassette holder 78 rests against the top of the cassette as seen in FIGURE 16 and others.

In order to release a cassette and to permit ejection of it, a release button 80, FIGURES 3 and 11, is provided. Depression of the release button 80 will cause the lock 75 to shift rearwardly tripping the lock holder 89 out of its notch and allowing the lock 75, on release of the button 80, to shift axially forwardly, until both cassette holders 76, 78 are in the release position of FIGURE 3. When the bar 75 is rotated, the spring 77 biases the bar forwardly to the release position of FIGURE 3. When the bar 75 releases the cassette, the travel limiter 67 is urged forwardly by its spring 74 to eject the cassette.

Figure 2:
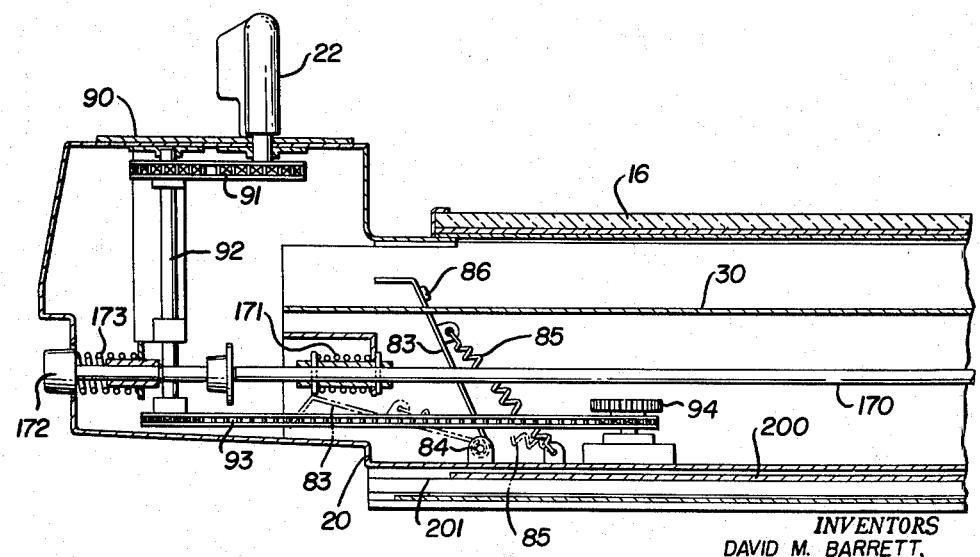
FIGURE 2 is an enlarged sectional view of the selector knob and associated mechanism as seen from the plane indicated by the line 2—2 of FIGURE 1.

Another of the features of the device resides in a novel radiation shield 83, FIGURES 2 and 11. This radiation shield is pivotally mounted at 84 on the bottom of the spot filmer frame 20. When the carriage 21 moves rearwardly from the load-unload position, a spring 85 biases the shield 83 against a stop 86 and into a shield position. When the carriage is moved forwardly, it will come into contact with the radiation shield 83 and pivot the shield out of the shield position to a retracted position out of the path of carriage travel. This retracted position is shown in phantom in FIGURE 2 and in solid lines in FIGURE 11. When the shield 83 is in its shield position, it extends transversely across the loading opening 66 to prevent radiation from emanating from the opening. Additionally, the shield has another purpose in that it prevents the insertion of a cassette through the opening 66 at all times except when the carriage 21 is in the load and unload position.

From this description it will be seen that for the first time a cassette carrier has been provided which automatically receives a cassette of any size within the acceptable range of the device in which, by simple rectilinear insertion through a slot, a cassette is automatically centered transversely and positioned appropriately longitudinally relative to the carriage.

THE POSITION CONTROL MECHANISM

The operation of this position control mechanism will be understood best by reference to FIGURES 2–7 and 9. As previously suggested, this subassembly includes the selector knob 22 which is positioned above a position indicating plate 90. The plate 90 indicates first when the mechanism is set for a given and selected radiographic sequence of exposures and second; what portion of a given and selected sequence has been completed. When the device is in operation, the operator rotates the selector knob 22 to any desired position which may be any one of those knob positions shown in FIGURES 16–26.

When the selector knob 22 is rotated to a desired position, it drives a chain 91, FIGURE 2. This chain 91 in turn drives an idler shaft 92 which drives a lower chain 93. The chain 93 causes a pinion gear 94 to rotate. When the pinion gear 94 is rotated an engaged selector knob control rack 95 is caused to move rectilinearly along a longitudinal path. A connected detent indexing control rack 96 is also caused to move rectilinearly. Further, spaced and parallel longitudinally-disposed sequence control cams 97, 98, FIGURES 9 and 14, are also caused to move rectilinearly. The upper of these sequence control cams 97 is the transverse positioning control cam while the lower of the cams 98 is the longitudinal positioning control cam.

Figure 6:
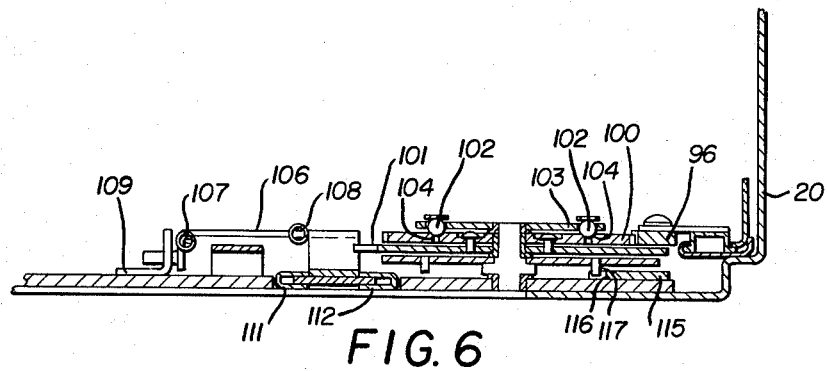
Figure 7:
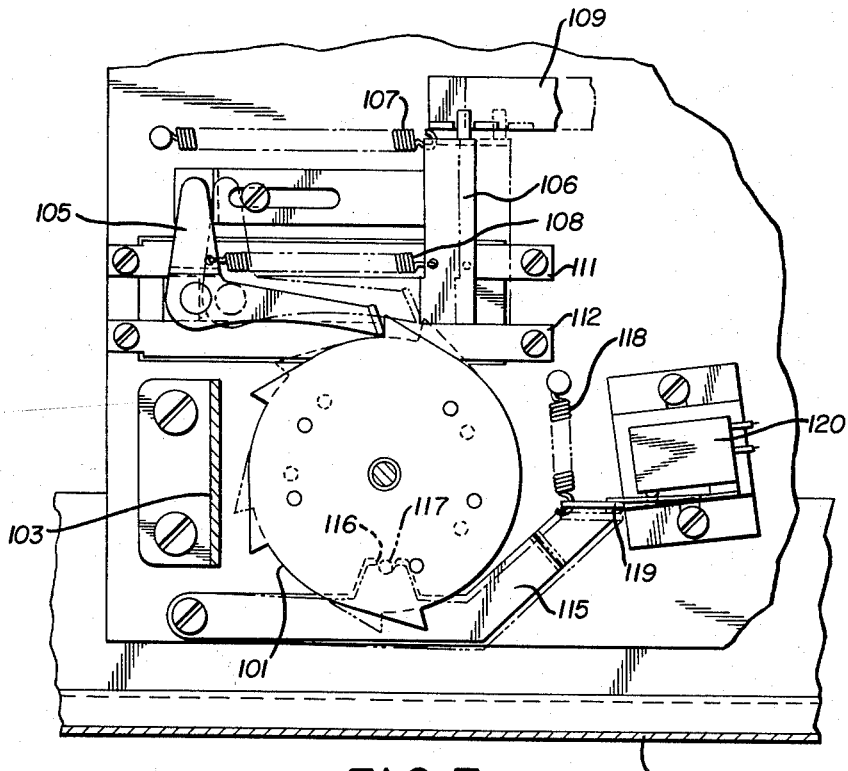

The detent control rack 96 engages a detent control pinion gear 100, FIGURES 4–6. The detent control pinion gear 100 is fixed to a ratchet cam 101. A pair of spring loaded ratchet balls 102 are positioned in apertures in a detent cover plate 103 and biased into engagement with aligned ones of a plurality of detent recesses 104 in the top of the detent pinion gear 100. The coaction of these balls 102 and the detent recesses 104 retards the movement of the pinion gear and holds it and the connected ratchet cam 101 in an indexed position.

A pawl 105 is biased by a pawl spring 108 against the ratchet cam 101. The pawl 105 is secured to an indexing bar 106 which is biased forwardly by an indexing bar 107. The bar 106 is connected to an indexing trigger 109 which extends rearwardly as can best be seen in FIGURE 9. The indexing trigger 109 includes a trigger tip 110 which projects upwardly to engage the rearward end of the cassette carriage 21 whenever the carriage is in the parked position of FIGURE 15. Whenever the cassette carriage 21 moves to the rearward or parked position, it will come in contact with the trigger tip 110 and move the indexing trigger 109 rearwardly against the action of the spring 107. This moves the detent bar 106 and the detent 105 rearwardly with it in movement guided by slide guides 111, 112, FIGURES 5 and 7. As the detent 105 moves rearwardly, it will index the detent cam 101 one position as suggested by the phantom lines of the detent 105 in FIGURE 7. This moves the sequence control cams 97, 98 an appropriate distance to provide for the next and subsequent cassette position in a radiographic sequence.

A double exposure preventing mechanism is provided which permits the operator to move the mechanism through a selected radiographic sequence and thereafter prevents any actuation of the mechanism other than to move the carriage to its unload position. To provide this feature, a double exposure preventing bar 115 is pivotally mounted on the frame 20 adjacent the detent cam 101. The detent cam 101 has a double exposure camming recess 116 which receives a projection 117 on the double exposure preventing bar 115. When the recess 116 and the projection 117 are aligned, a spring 118 moves the projection into the recess causing a switch actuating projection 119 on the end of the double-exposure arm 115 to trip a double-exposure-preventing microswitch 120. The electrical connections to the switch 120 will be discussed in greater detail in the electrical section of this disclosure. Suffice it to say that the switch 120 prevents any further exposure of a film carried in a cassette.

In order to permit ready indexing of the selector knob 22 and return of the switch 120 to its original condition, the sides of the recess 116 and the projection 117 are canted. This canting permits rotation of the detent cam 101 to cam the double exposure arm 115 out of engagement with the recess 116 when the mechanism is reset for a subsequent radiographic sequence.

The longitudinal travel assembly 24 and the cross travel assembly 26 which will be described in greater detail below, are respectively, controlled by cam followers 121, 122. These cam followers 121, 122 respectively engage the longitudinal position control cam 98 and the cross travel sequence control cam 97. This engagement is best seen in FIGURE 14 where a cam follower release arm 123 is also visible.

A cam follower releasing cam 124 is secured to the right hand side of the cassette carriage 21 and is visible in FIGURE 15. This cam follower release cam 124 engages the cross travel cam follower 122 and the cam follower release arm 123 whenever the carriage is in the park position of FIGURE 15. The cam follower release arm 123 is secured to the longitudinal travel cam follower 121 to pull it out of engagement with the cam 98 while the direct contact of the cam follower release cam 124 pulls the cross travel cam follower 122 out of engagement with the cam 97. Thus, movement of the cassette carrier 21 to the storage position permits the cam follower disengagement cam 124 to render the cam followers 121, 122 ineffectual. Similarly, since the trigger 109 pulls the detent 105 rearwardly out of engagement with the pawl, the detent will be held out of engagement with the pawl whenever the carriage 21 is in the storage position.

When the detent 105 and the followers 121, 122 are rendered ineffectual, the operator may freely rotate the selector knob 22 in either direction to shift the sequence control cams 97, 98 longitudinally to a selected position. Thus, the selector knob 22 and the sequence control cams together with the intermediate elements that mechanically connect these three parts together, form a settable portion of the position control mechanism. Rotation of the selector knob 22 to a desired position indicated by the position indicating plate 90 simultaneously shifts the sequence control cams longitudinally to an appropriate position to produce the sequence selected.

The cam follower release cam 124 serves a dual purpose. In addition to rendering the cam followers 121, 122 ineffectual for the purpose of manual setting of the mechanism, it also renders these two followers ineffectual to facilitate automatic indexing of the mechanism to a succeeding position in a radiographic exposure sequence. This is accomplished since the release cam 124 acts against the cross travel cam follower 122 and the follower release arm 123 prior to the time when the indexing trigger 109 is shifted rearwardly to advance the indexing ratchet cam 101, one position. Thus, the release cam serves to silence the mechanism since the followers 121, 122 are out of engagement with the travel control cams 97, 98 whenever these cams are indexed, whether manually or automatically.

*The longitudinal travel assembly*

The longitudinal travel assembly 24 can be understood best by reference to FIGURES 3, 9, 12 and 13 for explanation of the longitudinal travel producing mechanism and then by examination of the sequence positions, FIGURES 15-26.

Referring to FIGURE 3, a longitudinal travel slide 128 is provided. The slide 128 is rectilinearly movable in a path defined by a pair of slide tracks 129. During any sequential movement of the cassette carriage 21 from its storage position of FIGURE 15 to any one of the more forward positions shown in FIGURES 3 and 16-26, the longitudinal travel slide 128 travels substantially the entire length of the tracks 129. The slide 128 travels from a rearward storage position which is not shown in the drawings to the forward position of FIGURE 3 and other of the figures each time the carriage is advanced and it then retracts fully to its storage position each time the carriage is returned to the storage position of FIGURE 15.

This reciprocal travel of the travel slide 128 is produced by a travel link 130 which is pivotally connected to the frame 20 at 131. The link 130 is connected to the longitudinal travel slide 128 at 132 so that pivotal movement of the link 130 about the pivot 131 will cause reciprocal movement of the slide 128.

Pivotal movement of the travel link 130 is caused by an eccentric link 133. The eccentric link 133 is pivotally connected to the travel link 130 intermediate the connections at 131 and 132. The eccentric link 133 is also pivotally connected at 134 to a projection on an eccentric plate 135. Slip clutch plates 136 sandwich the eccentric plates between them, FIGURE 13. These slip clutch plates are drivingly connected to a carriage drive motor 137.

Each time the mechanism is actuated to retract the carrier 21 from the loading position of FIGURE 3, the eccentric plate 135 will be caused to rotate about 180° retracting the travel slide 128 to its storage position. When the carriage is fully retracted, a limit switch, which will be described below, breaks the circuit to the motor 137. When the mechanism is actuated to move the carriage 21 forwardly from the parked position of FIGURE 15, the eccentric plate 35 will again be rotated approximately 180°, this time in the opposite direction.

The longitudinal travel slide 128 is connected to the carriage 21 by a longitudinal travel arm 139. The longitudinal travel arm is pivotally connected to the slide 128 at 140. A roller 141, FIGURE 11, is rotatably mounted on the outer end of the arm 139 and disposed within the slide cross member 35 for coacting longitudinal travel producing engagement.

Whenever the longitudinal travel slide 128 is caused to reciprocate in its slide tracks 129, a corresponding amount of movement of the cassette carriage 21 will occur because they are connected together by the longitudinal travel arm 139. Additional longitudinal travel of the carriage is produced by causing the travel arm 139 to rotate about the pivot 140. Thus, if the travel arm 139 is caused to pivot a maximum amount about the pivot 140, the carriage 21 is moved to its load position as shown in FIGURE 3. If rotation of the longitudinal travel arm 139 about its pivot 140 is limited, a minimum amount of forward travel of the carriage 21 which is slightly greater than the forward travel of the travel slide 128 will be obtained and the carriage will assume a longitudinal position shown in FIGURES 16 and 18, among others.

It will be appreciated that the eccentric plate produces slow initial slide movement accelerating quickly to a maximum and thereafter smooth and positive deceleration. Since the travel arm may be cause to rotate relative to the slide, the acceleration and deceleration of the carriage relative to the slide is similar. Since these two crank-like movements of the eccentric plate 135 and the travel arm 139 occur simultaneously, the acceleration of the carriage is adequate to shift the carriage within the time allowed. With this construction, substantially the same amount of time is required to move the device from the park position to each forward position, thereby reducing the time required for some exposures and greatly facilitating the synchronization of an exposure with the positioning movement of the carriage.

In order to obtain desired amounts of rotation of the longitudinal travel arm 139, a longitudinally movable carriage travel control rack 143 is provided. The travel arm 139 is formed with a gear segment portion 144 which engages the longitudinal travel control rack 143. The longitudinal travel control rack is fixed to a travel control cam 145. The rack and cam 143, 145 are slidably mounted in rack longitudinal guide tracks 146, FIGURE 3. Restraining of the rack travel control cam 145 in its fully retracted and most rearward position of FIGURE 3 will produce maximum rotation of the travel arm 139 when the slide 128 is advanced. Conversely, permitting the rack travel control can 145 to travel with the travel arm 139 to its most forward position of the cam 145, FIGURE 16 and others, will limit the rotation of the travel arm 139 and therefore produce a minimum amount of forward travel of the cassette carriage 21.

Whenever the longitudinal travel slide 128 is moved forwardly, the longitudinal travel control rack 143 and its connected cam 145 will move forwardly with it assisted by a cam assist spring 147, FIGURE 9. When further forward travel of the rack travel control cam 145 is prevented, rotation of the travel control arm 139 will commence. Thus, retention of the rack travel control cam 145 at predetermined longitudinal positions effects a positioning of the cassette carriage 21 in a desired longitudinal position.

A plurality of stops 148–153 are provided on the rack travel control cam 145 to effect the selection of the amount of longitudinal travel of the cam 145. These stops 148–153 are on the right-hand side of the cam which is the lower side as viewed in FIGURE 9 where they are identified. The forwardmost stop 148 is the unload stop. When the unload stop 148 is engaged by a cam travel arresting lever 155, as shown in solid lines in FIGURE 9 substantially no forward travel of the cam 145 will be obtained and forward movement of the slide 128 will move the carriage 21 to the unload position of FIGURE 3.

With the typical presently commercially available cassette mentioned above, of 8" x 10" or 10" x 12" sizes, there are five amounts of forward cassette carriage travel required to produce the desired full range of radiographic exposure positions. The forwardmost amount of travel of the cassette carriage 21 for radiographic exposure is obtained when cam travel arresting lever 155 engages the forwardmost radiographic travel control stop 149. This engagement is effected whenever one wishes to expose either the rearward one-half or either rearward quarter of a film carried in a cassette having a 10" longitudinal dimension. These are the rearward quadrant positions of FIGURES 17 and 19 and the rearward half position of FIGURE 23.

Figure 26:
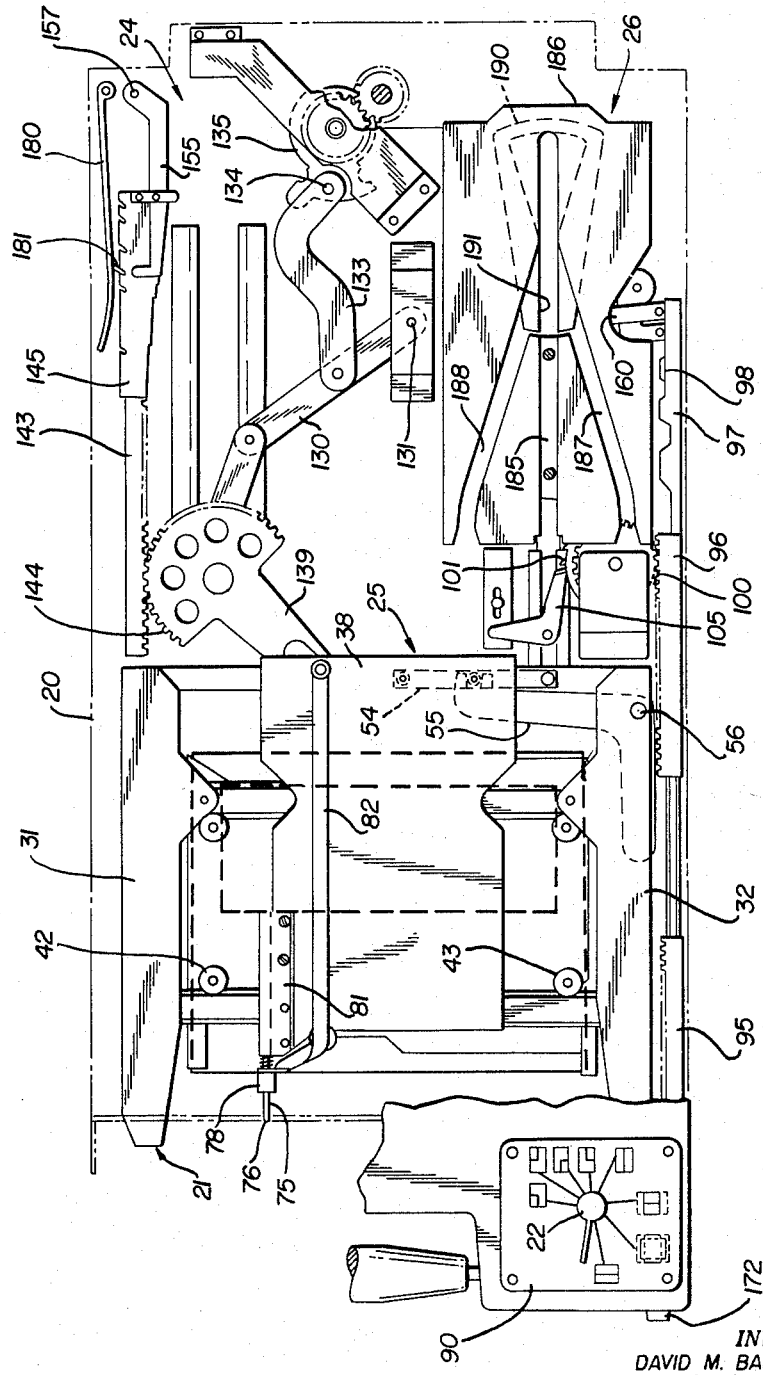

When one wishes to expose the rearward half of a cassette having an 8" longitudinal dimension, slightly less forward travel is desired, and therefore, the travel arresting lever 155 engages the secondmost forward radiographic travel control stop 149, FIGURE 26.

When one wishes a full radiographic exposure of the entire film, or an exposure of one-half of the film when the film is divided longitudinally into halves, the cassette carriage 21 must be moved to its centralmost radiographic position longitudinally speaking. This amount of movement is effected when the cam travel arrest lever 155 engages a radiographic center travel control stop 151. These are the positions of FIGURES 20, 21 and 24. When one wishes to expose the forward half of a cassette having an 8" longitudinal dimension, the cam travel arrest lever 155 must engage the secondmost rearward radiographic travel control stop 152. This is the position of FIGURE 25. When the least amount of forward movement of the cassette carriage 21 is required, one wishes the maximum amount of forward movement of the rack travel control cam 145. Accordingly, the cam travel arrest lever 155 engages the rearwardmost radiographic travel control stop 153 to obtain the positions for radiographic exposure of either forward one-quarter of the film, FIGURES 16 and 18, and radiographic exposure of the forward one-half of the film, FIGURE 22. Again, the FIGURE 22 position exposing the forward one-half of a film is with a film in a cassette having a 10" longitudinal dimension as distinguished from the forward half of an 8" film as in FIGURE 25.

As an examination of FIGURE 9 and other of the figures will reveal, the travel control stops 148–153 are both longitudinally and transversely spaced from one another. The indexing of the cam travel arrest lever 155 into an appropriate position so that its stop contact shoulder at 156 engages an appropriate stop is obtained by rotating the travel arresting lever 155 predetermined amounts about a pivotal support 157. This rotation of the travel arresting lever 155 for predetermined amounts is obtained by laterally moving a cross arm 158 to appropriate lateral positions. The cross arm 158 is pivotally connected to the arresting lever 155 and 159.

A pivotally mounted longitudinal travel control link 160 is positioned near the rearward right-hand corner of the frame 20. This is the lower part of FIGURE 9. This longitudinal travel control link 160 carries the longitudinal cam follower 121 which engages the longitudinal position control cam 98. In addition, the longitudinal travel link 160 has an upwardly extending cross arm pin 161 secured near its rearward end. This pin selectively engages one of two shoulders 162, 163 in a notch in the cross arm 158. As viewed in FIGURE 9, the upwardmost of these shoulders 162 is an arresting lever positioning shoulder. The shoulder 163 is an eject shoulder whose purpose and function will be described in greater detail below.

A spring 165 is secured to the cross arm 158 and the frame 20 to pull the cross arm upwardly as seen in FIGURE 9. This spring 158 maintains the shoulder 162 in abutment with the pin 161 throughout a radiographic sequence and until an ejection cycle is started. Another spring 166 is secured to the cross arm 158 and the travel control link 160 to pull the cross arm 158 forwardly and assist in maintaining the pin 161 in a coordinated position relative to either of the shoulders 162, 163.

At all times other than during an exposure sequence, the transverse position of the cross arm 158 is controlled then by the pivotal position of the travel control link 160. The pivotal position of the travel control link is controlled by the longitudinal travel cam follower 122 which is biased into engagement with the longitudinal control cam 98 by the spring 165.

Since the cross arm 158 and the cam travel arrest lever 155 are pivotally secured together at 159, the transverse position of the cross arm 158 controls the position of the travel arresting lever 155 and therefore controls the amount of forward travel of the rack travel control cam 145.

An eject rod 170 extends along the right-hand side of the spot filmer substantially throughout the longitudinal length of the frame 20. This rod 170 is visible in FIGURES 2, 3, and 10 among others. The rod is biased normally forwardly by a rod control spring 171, FIGURE 2. An ejection button 172 is provided and also normally biased forward by an eject button spring 173.

The eject button 172 has a rearwardly extending projection which engages the rod 170. When the eject button 172 is pressed rearwardly, it urges the rod 170 rearwardly with it causing a cross arm trip 175 on the rearward end of the rod to strike the cross arm 158. This action moves the cross arm 158 from its position shown in phantom in FIGURE 9 until the pin 161 slides out of engagement with the travel arresting lever control shoulder 162. The action of the spring 165 then pulls the cross arm laterally to the left, to the top in FIGURE 9, until the pin 161 is near the eject shoulder 163.

This movement of the cross arm 158 shifts the longitudinal travel arresting lever 155 to its ejection position shown in solid lines in FIGURE 9 and also locks the cross travel assembly in a manner which will be described below. This ejection position of the cross arm 158 is the position shown in solid lines in FIGURE 9.

When the cassette carriage 21 is returned to its storage position of FIGURE 15, the cross arm 158 is reset for the obtainment of an appropriate one of the radiographic sequence positions. This resetting is obtained by the co-action of a reset trip 176 which is secured to the eccentric plate 135. On rotation of the eccentric plate 135 to its storage position, the reset trip 176 strikes a reset projection 177 on the cross arm 158. This shifts the reset projection 177 from the position shown in solid lines in FIGURE 9 to the position shown in phantom lines in FIGURE 9 carrying the cross arm with it. As the cross arm moves laterally to the right, again downwardly in FIGURE 9, the longitudinal travel control link 160 will travel with it until it strikes an adjustable control stop 178 secured to the base of the frame 20. This adjustable stop 178 prevents further pivotal movement of the link 160 in a clockwise direction as seen in FIGURE 9, while the cross arm 158 continues to travel in its reset movement. The further traveling of the cross arm 158 will cause the pin 161 to slide relative to the cross arm until it is indexed into alignment with the travel arresting lever control shoulder 162. The tension of the spring 166 will draw the pin 161 and the cross arm together such that the pin is again brought into abutment with the travel arresting lever control shoulder 162. After the reset trip 176 strikes the reject projection 177 and shifts it to its phantom line position of FIGURE 9, the reset trip will pass the reset projection 177 and continue to travel until the eccentric plate 35 strikes a forward travel stop 179. At this time, a switch 248 which controls the motor 137 is actuated to stop the motor.

In order to assure the maintenance of the travel control cam 145 in an indexed position, a travel control cam lock 180 is provided. The travel control cam lock 180 is pivotally mounted on the frame and biased to urge a projection 181 on the lock 180 into an appropriate one of a plurality of notches 182 on the left-hand side of the rack travel control cam 145. When the carriage is in the storage position a roller 183, FIGURE 3, pivots the lock 180 to its disengaged position shown in phantom in FIGURE 9. Whenever the carriage 21 moves forwardly, the roller moves out of engagement with the lock 180, permitting it to be biased back to the lock position shown in solid lines in FIGURE 9.

CROSS TRAVEL ASSEMBLY

The description of the cross travel assembly 26 will be directed primarily to FIGURES 3, 9, and 14. The purpose of the cross travel assembly is to move the cross carriage 25 laterally from the central position (which it is in in the park position in FIGURE 15) to one side or the other to the exposure positions of FIGURES 16–21. The position of FIGURE 16 with the cams 97, 98 fully moved rearwardly in the spot filmer and selector knob 22 pointing to the designation of the forward left-handed quadrant, may be considered to be the first position. Considering this to be the first position and reading clockwise, the lateral movement of the cross carriage 25 is, then, obtainable in the first six positions. As will be described in greater detail in the electrical section, switches are provided so it is impossible to energize the mechanism in these six positions unless the positioned cassette is sufficiently narrow to permit cross travel without jamming the mechanism. Thus, in order to obtain cross travel, it is first necessary to either have no cassette in the carriage 21 or to position, in the case of the commercially available cassettes, an 8" x 10" cassette with the 8" dimension transversely with respect to the spot filmer.

The cross travel subassembly 26 includes a central guide track 185 and a track plate 186 is secured to the frame 20. The track plate 186 defines right- and left-hand guide tracks 187, 188. A cross travel control roller 189 is secured to the underside of the carriage, FIGURE 10. This cross travel control roller engages an appropriate one of the three tracks 185, 187, 188 and guides the cross carriage 25 into either a central or a right or a left position.

As has been suggested previously, when the carriage 21 is in the storage position of FIGURE 15, the cross travel lock bar 55 is pivoted out of engagement with the cross travel lock pins 51–53. As the carriage moves forward and the cross carriage is indexed to the right, left, or center, the roller 57 rides up on the cam 58 pivoting the lock bar 55 into locking engagement with an appropriate one of the pins. This pivotal action of the lock bar 55 occurs as the cross travel roller 189 emerges from an indexed one of the three tracks.

Figure 18:
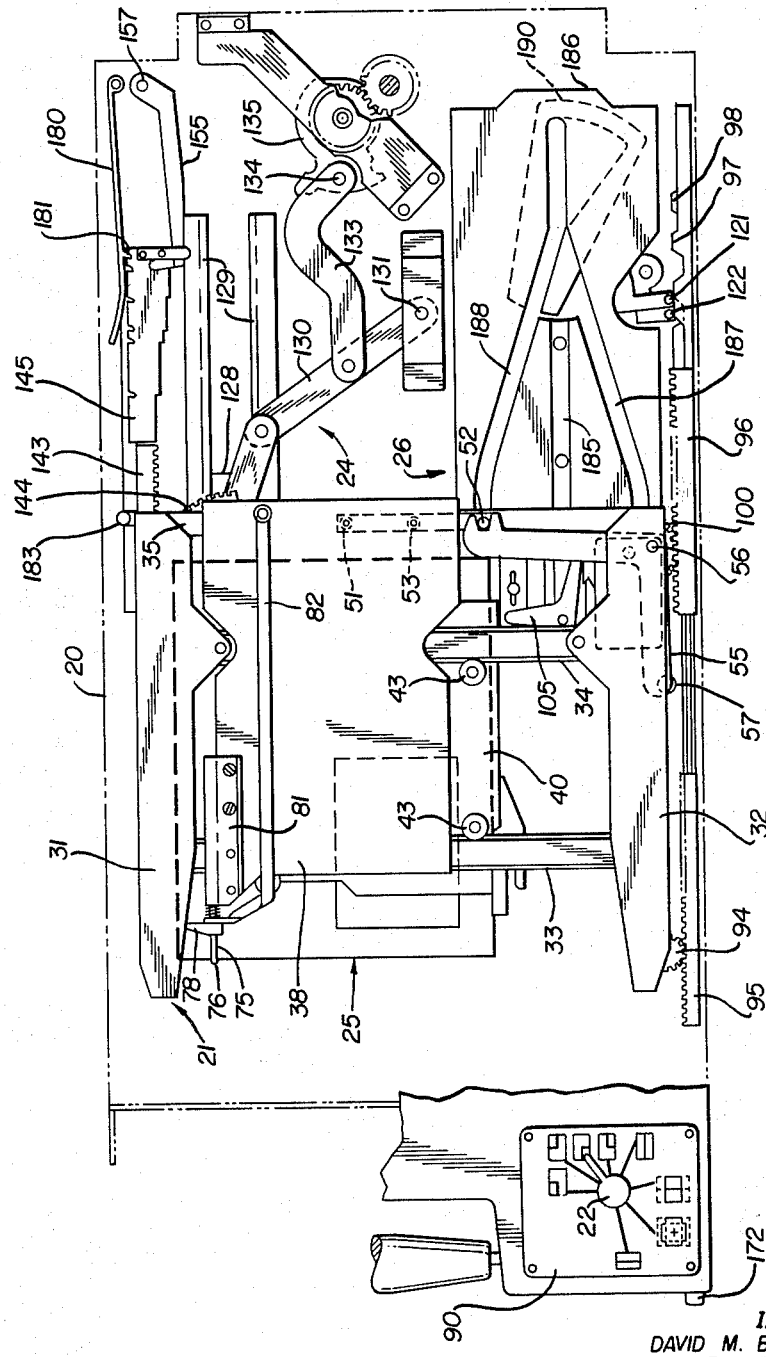
Figure 19:
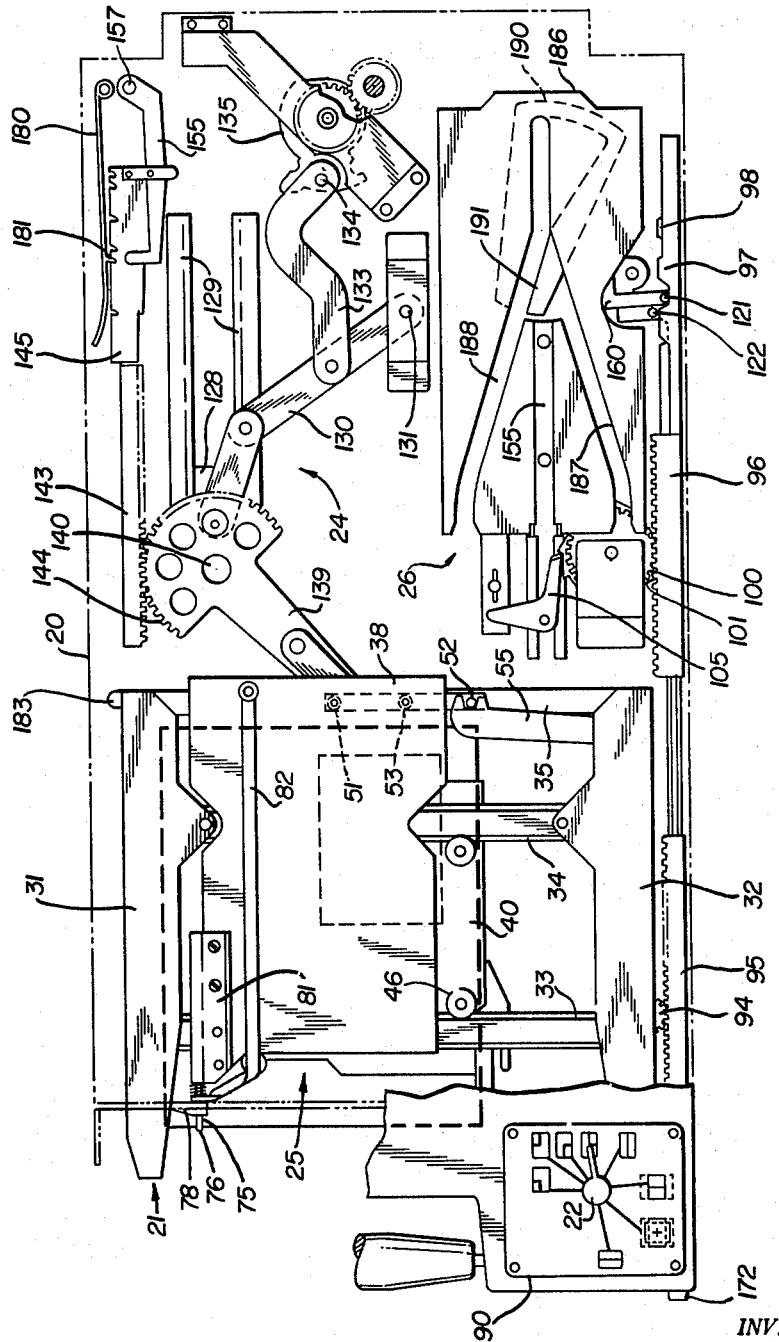
Figure 20:
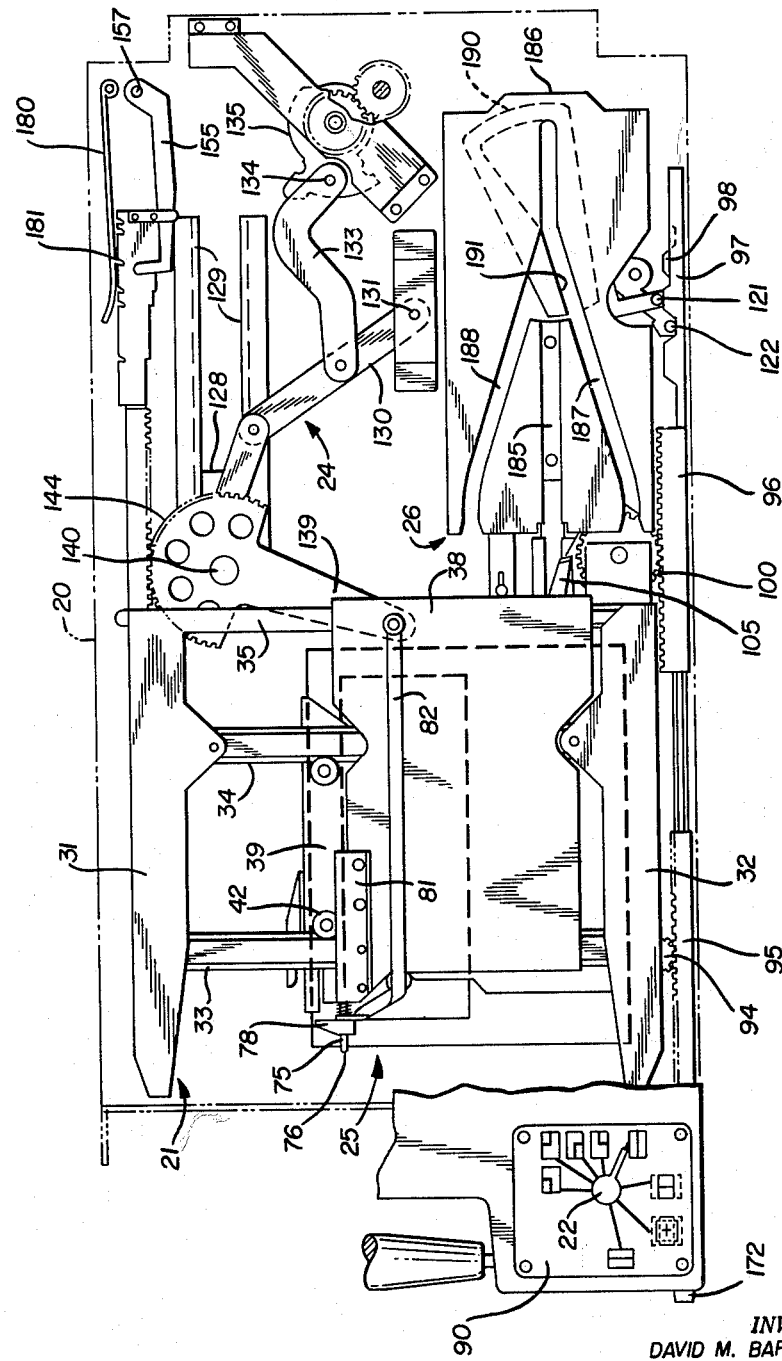
Figure 21:
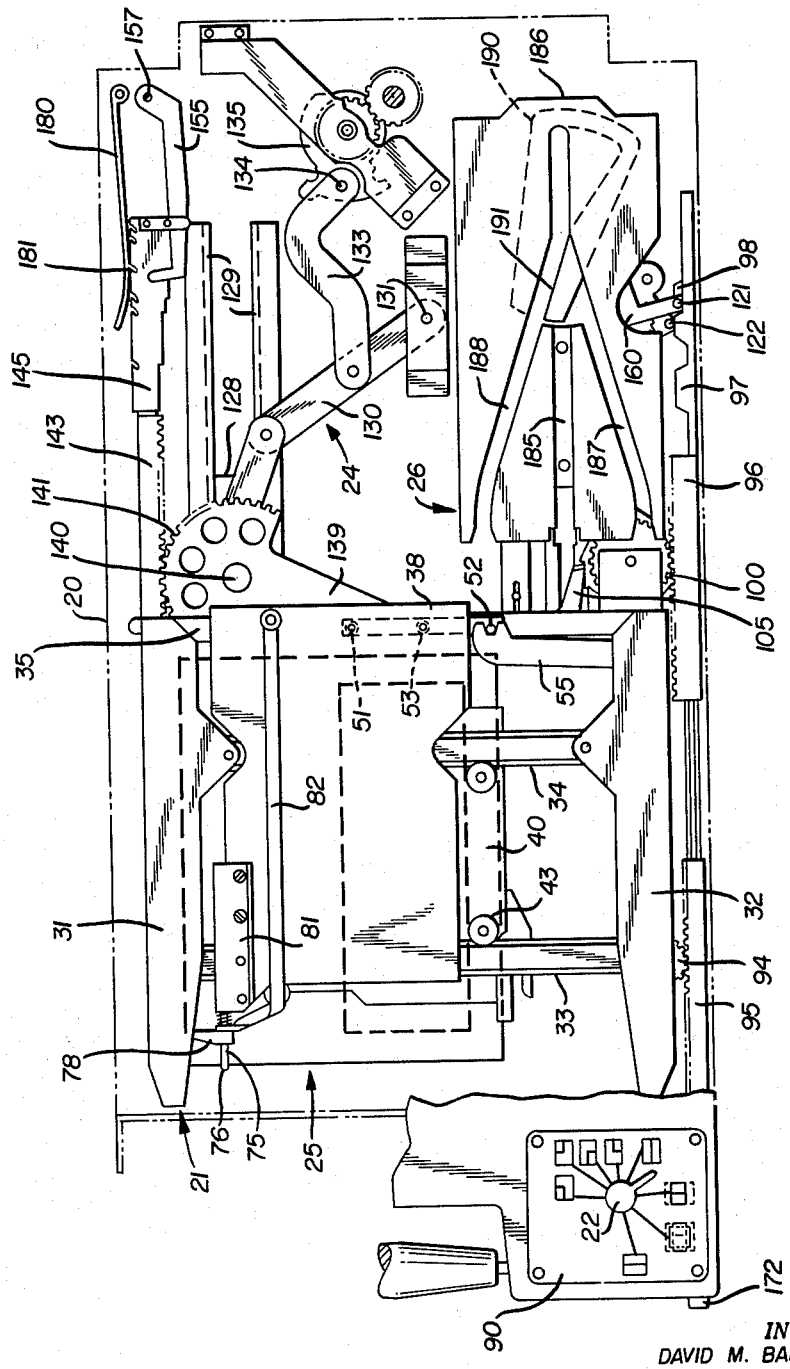
Figure 22:
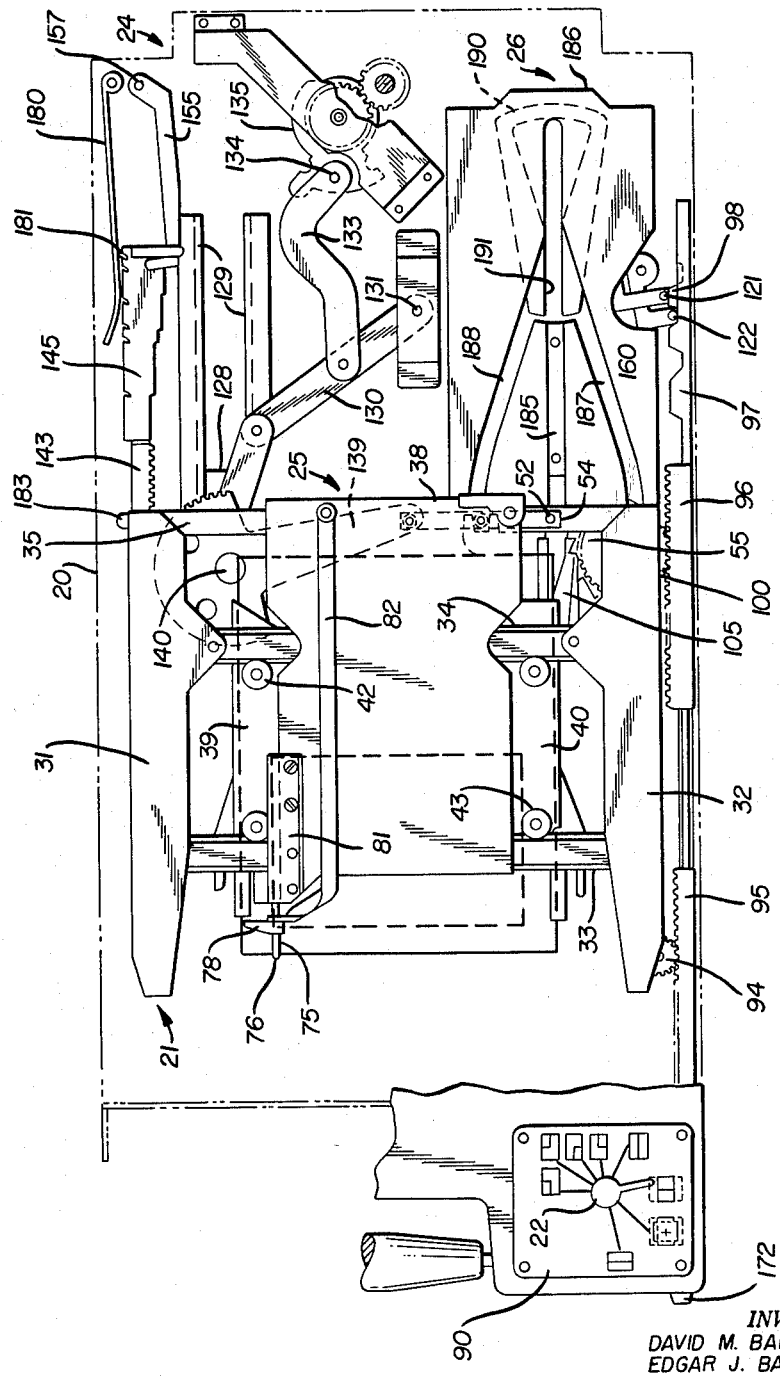
Figure 23:
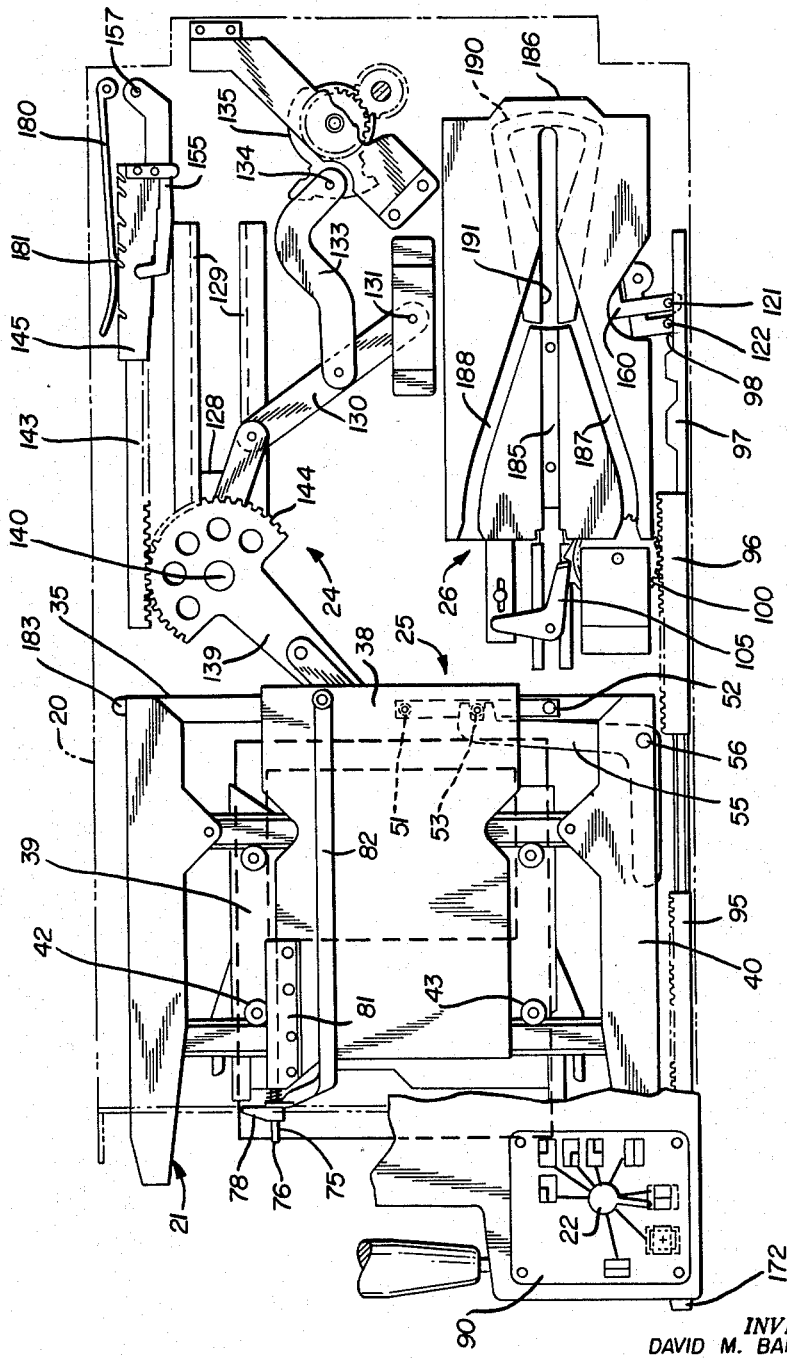
Figure 24:
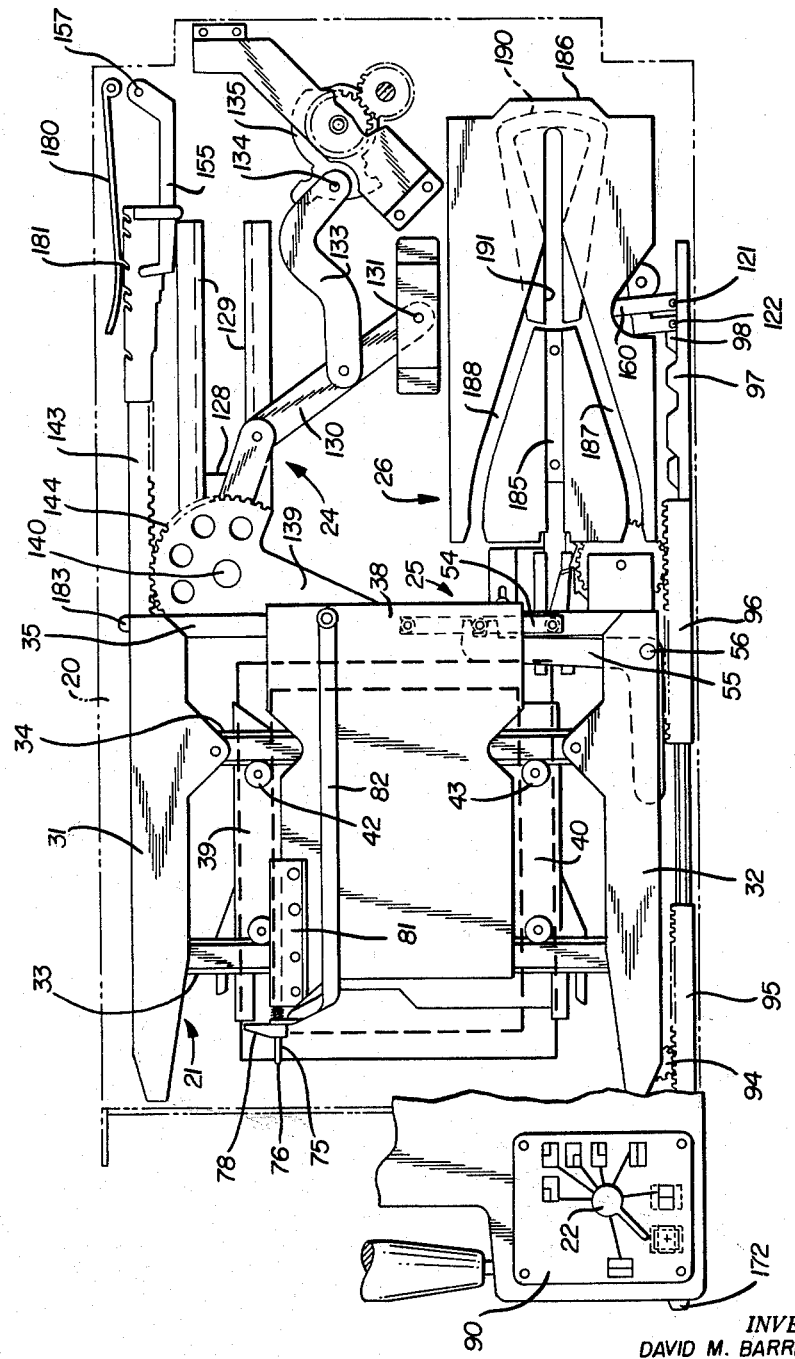
Figure 25:
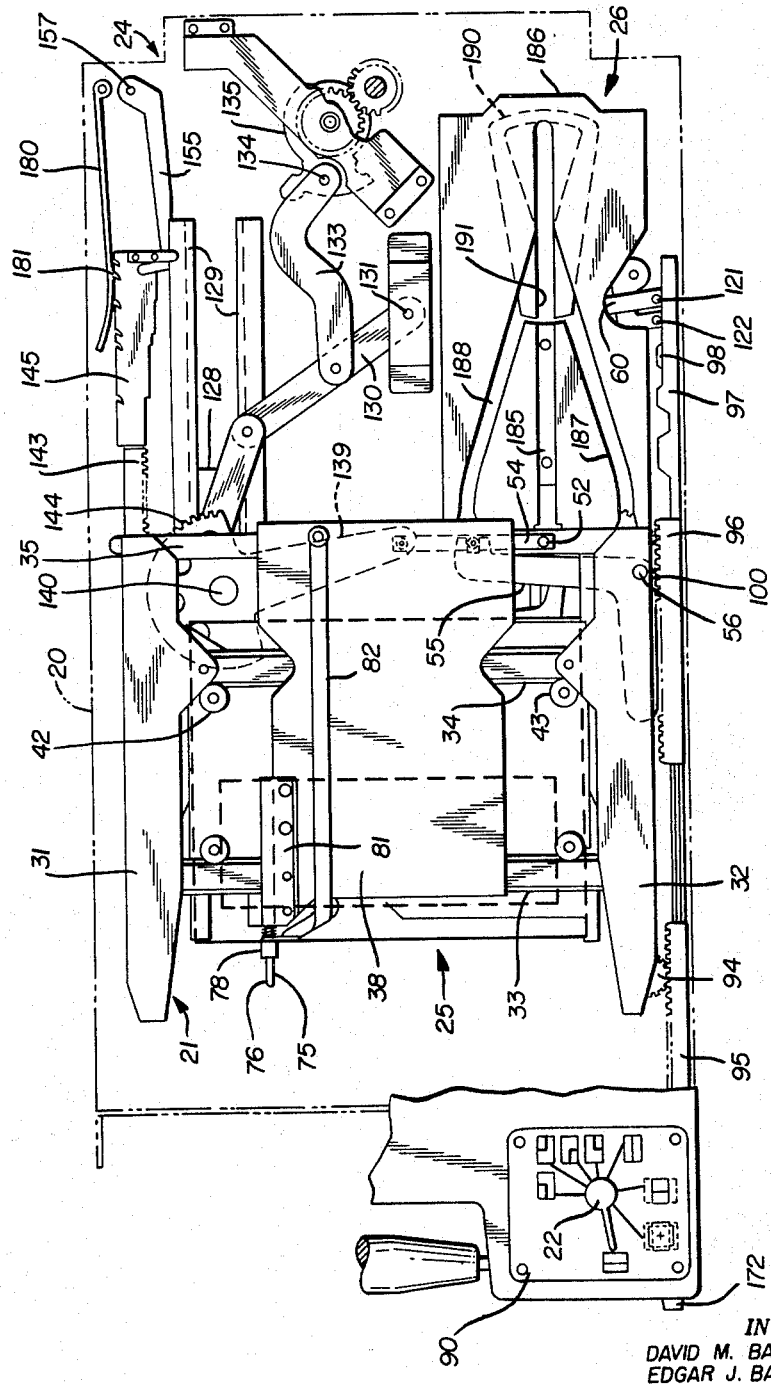

In order to index the cross travel roller 189 into the appropriate one of the three tracks, a track switch 190 is provided. The track switch 190 is pivotally mounted on the base of the frame 20. The track switch 190 includes an indexing track 191 which is selectively orientated with one of the three tracks, 185, 187, 188. Thus, in FIGURES 3 and 9, the indexing track 191 is oriented with the central track 185 so that when the carriage advances the cross carriage will be in its central position. In FIGURE 16, the indexing track 191 is oriented with the right-hand track 187 and it has caused the cross carriage 139 to shift to its right-hand cross travel position. In FIGURE 18, the indexing track 191 is oriented with the left-hand track 188 and the cross carriage 25 has been caused to travel laterally to its left-hand cross travel position.

The positioning of the track switch 190 is controlled by the cross travel cam follower 122 coacting with the cross travel sequence control cam 97. The cross travel cam follower 122 is fixed to a pivotal cross track link 193 which in turn is pivotally connected to the underside of the track switch 190. Springs 194 are connected to the track switch 190 tending to bias it into its central position. The action on the cam follower 122 riding against the cross travel control cam 97 indexes the track switch 190 selectively into the appropriate one of its right-, central, or left-handed positions against the action of the springs 194.

Whenever the carriage 21 returns to the park position of FIGURE 15 the cam follower is rendered ineffectual as has been described above. Thus, prior to the start of any sequence the cam follower 122 is brought out of engagement with the cross travel cam 97.

It is desirable to be able to shift the carriage 21 to the unload position no matter what position the position control mechanism is in. Accordingly, the mechanism is such that prior to the time when the cam follower 122 is disengaged and the track switch 190 is held in its central position by coaction of the carriage with a spring loaded track switch trigger 201 each time the carriage is in the park position. In order to permit the follower 122 to be lifted off the cam 97, the link 193 is made of two relatively slippable sections which are biased together by a spring 192, FIGURE 9. The section 193a carries the cam follower 122 and rotates relative to the section 193b against the action of the spring 192 each time the follower 122 is lifted off its cam because the section 193b and the cross track switch 190 are held by the carriage and switch trigger 211 at such time.

When the ejection button 172 is depressed and the cross arm 158 is shifted to its eject position shown in solid lines in FIGURE 9, this shifting locks the track switch 190 in its central position. In order to effect this locking of the track switch 190, a track lock link 195 is provided. This track lock link 195 is pivotally mounted on the frame and rests against a link actuating projection 196 on the cross arm 158. A lock link spring 197 biases the track switch lock link 195 against the link actuating projection 196. Whenever the cross arm 158 moves to the reset position, the track switch lock link 195 is pivoted into locking engagement with a notch on a lower track switch lock plate 199, FIGURE 13, to fix the track switch 190 in its central position. Thus, when the eject button is pushed, the track switch 190 is immediately locked in its central position. As the carriage 21 moves forward, and the cam follower disengagement cam 124 moves out of engagement with the cross travel cam follower 122, allowing it to pivot against the cross travel cam 97, no movement of the track switch 190 will or can be effected.

This lower lock plate 199 is immediately below an upper track switch lock plate 198, FIGURES 9 and 14. This upper lock plate has notches 211. An appropriate one of the notches 211 is engaged by a carriage actuated track lock 212, FIGURE 3, each time the carriage moves forwardly to a radiographic exposure position. The notch on the lower lock plate 199 is obscured by the upper plate in the drawings and it is substantially directly under the central one of the notches 212.

RECIPROCATING GRID

The spot filmer includes a reciprocating grid 200 which is reciprocally mounted in tracks 201 on the underside of the frame, FIGURE 10. A reciprocatable grid drive rod 202 is also visible in FIGURES 10 and 30.

In spot film devices, it is preferable that the reciprocating grid can be stored rearwardly of the fluoroscopic screen 16 whenever one wishes to conduct a fluoroscopic study. This is especially desirable if an image intensification system and a closed circuit television unit is utilized rather than a fluoroscopic screen. At the same time, it is important to have the grid positionable beneath the cassette whenever a radiographic exposure is to be made. The present invention provides a greatly simplified mechanism for selectively positioning the reciprocating grid 200 beneath the cassette for reciprocal movement. A grid drive clamp 203 is provided. The details of construction of the grid drive clamp 203 are best seen in FIGURE 30.

The grid drive clamp 203 includes rearward and forward mirror image clamp arms 204, 205. These clamp arms 204, 205 are apertured at 206, 207. The grid drive rod 202 extends through the apertures 206, 207. A spring 208 is around the drive rod 202 and between the clamp arms 204, 205. The spring 208 biases the rearward and forward clamp arms 204, 205 outwardly about their pivots 209 until the walls defining the apertures 206, 207 frictionally and drivingly engage the grid drive rod 202. Thus, whenever the drive rod 202 is reciprocated, the grid drive clamp 203 will be caused to reciprocate with it. Since the grid drive clamp is fixed to the grid 200 the grid, of course, will also reciprocate.

If one wishes to shift the grid 200 forwardly, one need only press on the outer end of the rear clamp arm 204 causing it to disengage from the drive rod 202 as shown in phantom in FIGURE 30. This will also push the grid and grid drive clamp 203 forward while the forward clamp arm 205 will automatically disengage itself. As soon as forward pressure on the rear clamp arm 204 is released, the spring 208 will cause the clamp arms to grip the grid drive rod 202 in the selected position. Pressure on the forward clamp arm 205 will cause the reverse motion and permit facile parking of the grid under the rearward portion of the frame 20.

A limit switch 211 is provided which will break a circuit energizing grid motor 210 whenever the grid 200 is moved to a park position. The grid motor and its limit switch 210, 211 are shown only in the wiring diagram of FIGURE 28. The limit switch, of course, is positioned under the underside of the frame so that the grid itself will actuate it when the grid is moved to a park position. The motor may be suitably positioned on the frame for driving connection to the grid drive rod 202. Preferably the driving connection will be of the heart-shaped cam type described and claimed in U.S. Patent 2,767,323 issued October 16, 1956, mentioned above.

THE ELECTRICAL CIRCUIT

In FIGURE 27, a wiring diagram of the electrical circuit is shown. The switches in this diagram are positioned as though an exposure sequence had been completed and the spot filmer carriage 21 is in the parked position of FIGURE 15. When the mechanism is in this position, the operator will wish to depress the eject button 172 and cause the carriage 21 to move to the unload position of FIGURE 3.

When the eject button is pressed an eject switch 215 is closed. Simultaneously a momentary contact eject switch 216 is moved from the position shown in the wiring diagram to close a circuit energizing an eject relay 217. The relay 217, then, is energized through a circuit from one side of a line $L_1$, through a conductor 218 to the relay 217 then through conductor 219 to the eject switch 215 which is connected to the momentary eject switch 216 by a conductor 220. The momentary eject switch 216 is in turn connected through a conductor 221 to the other side of the line $L_2$.

When the relay 217 is energized a multiple contact solenoid controlled switch is actuated. This switch has a carriage motor contact 222, a grid motor contact 223, and an X-ray circuit contact 224. With the relay 217 energized this multiple contact switch is moved from the position shown to its other position where the carriage motor 137 is energized in a forward direction. The energizing of the carriage motor 137 in a forward direction is accomplished through a conductor 225 which connects the carriage motor contact 222 to $L_1$. The contact 222 is in turn connected through the contact 223 to a conductor 226, which extends to the forward direction side of the carriage motor 137. The carriage motor 137 is connected to the side $L_2$ of the line with another conductor 227.

So long as the eject button 172 is maintained in a depressed condition the momentary eject switch 216 will maintain this described relay energizing circuit closed and the carriage motor will operate to advance the carriage. When the carriage reaches the forward end of its travel two forward limit switches are tripped. One of these, 228 is connected to the conductor 226, breaking the circuit to the carriage motor 137 and stopping its rotation. The other switch which is triggered when the carriage reaches its forward position is a relay hold forward limit switch 229. This switch 229 is closed to parallel the eject switch 215. The relay hold limit switch 229 is connected to one contact of the momentary eject switch 216 by a conductor 230. When the carriage reaches the forward position, if the eject button 172 is maintained in a depressed condition, the previously described circuit will maintain the relay 217 in an energized condition. If the eject button is released, then the relay switch 217 is maintained in an energized condition through the relay hold switch 229, conductor 230, and thence through the momentary eject switch 216 to the line $L_2$ through the conductor 221.

A load light 231 is positioned on the forward end of the housing. This load light is lit whenever the relay 217 is energized. Thus, the load light 231 is connected in parallel with the relay 217 by a conductor 232. The purpose of the load light 231 is to indicate when the carriage is in its forward load and unload position.

A latch sensing switch 234 is mounted on the carriage for energization by the lock 75. The latch switch 234 is open whenever the lock 75 is in its lock position. A cassette-responsive switch 235 is connected in series with the latch switch 234. The cassette-responsive switch is positioned on the carriage for closure whenever a cassette is either partially or fully positioned in the carriage.

Whenever the carriage is in a forward position it cannot retract until either the latch switch 234 or the cassette switch 235 is open. This is true because the forward limit switch 229 is closed and a relay energizing circuit is maintained through the switches 229, 234, 235. Thus, if there is no cassette in the device, the cassette limit switch 235 will be open and the carriage can be retracted. If a cassette is properly positioned in the device, then the lock 75 will be in its locked position and the latch switch 234 will be open. In either event, then, with either no cassette or a properly positioned cassette, the carriage can be retracted to its parked position. At all other times, it is impossible to retract the carriage because both of these switches are closed. Thus, it is impossible to damage the mechanism by retracting the carriage when a cassette is improperly positioned on it.

A pair of forward motion preventing limit switches 236, 237 are provided and connected in parallel. These switches are provided to prevent forward motion of the carriage motor, other than for eject, if the mechanism has a cassette which is too large positioned in the carriage and an operator attempts to advance the carriage in one of the first six radiographic positions. Thus, the switch 237 is a switch which is open if a cassette greater than 8" in width is positioned in the carriage. The parallel switch 236 is automatically open whenever the selector knob 22 is in one of the first six positions of FIGURES 16–21. In the wiring diagram both are shown in an open position to designate a cassette greater than 8" width with the selector knob in one of the positions other than the positions of FIGURES 22–26.

A conductor 238 connects a double exposure light 239 to the one side of the line $L_1$. The light 239 is connected, in turn, to double-exposure switch 120 by conductor 240. The double-exposure switch 120 is series connected with the parallel limit switches 236, 237 by conductor 241. They, in turn, are connected to the conductor 226 by another conductor 242. Thus, whenever a radiographic series is completed, the double-exposure switch 120 will move to the position shown in the wiring diagram and the double exposure light will be lit. The double exposure light is a high resistance light so that although it is in series with the carriage motor 137, there is insufficient energy passing through the motor to cause it to drive the carriage in a forward direction. The eject forward circuit which has been described above parallels this double exposure light so that when the eject button is depressed, the carriage motor will drive the carriage forward to the unload position. At the same time, the double exposure light is shunted out. It will relight when the relay is de-energized and remain on when the carriage is returned to the park position until the mechanism is reset to move the double-exposure switch.

When it is desired to return the carriage to its parked position, first as noted above, it is essential that either a cassette is properly positioned or there is no cassette in the carriage. Assuming one or the other of these conditions to be the case, the eject button 172 is again depressed. This time the eject switch 215 is returned to its open position and the momentary eject switch 216 is again moved to the position where it connects the conductors 220 and 221 together. With the switches in this position all circuits which may energize the relay 217 are broken and the multiple-contact solenoid-energized switch returns to the position shown in the drawings.

With the multiple contact switch returned to its de-energized condition, the carriage motor contact 22 energizes a motor retract circuit. This retract circuit is from the contact 222 through a conductor 244 and then through a contact 245 of a push button advance switch 246. The contact 245 is connected to the reverse side of the reversible carriage motor 137 by a conductor 247. When the carriage reaches the parked position of FIGURE 15, the reverse limit switch 248 in the conductor 247 will be opened to conclude the reverse travel.

From the preceding discussion it will be seen that the contact 245 of the push button advance switch 246 is connected to the line $L_1$ whenever the solenoid 217 is de-energized. This connection is from the line $L_1$ through the conductor 225, the carriage motor contact 222, and then conductor 244, to the push button switch contact 245.

Assuming a cassette is loaded, the device is in the parked position of FIGURE 15, and the device has been reset to move the double-exposure switch from the position shown in FIGURE 9 to its other position, actuation for an exposure is obtained by depressing the push button advance switch 246. When the switch 246 is depressed, the contact 245 energizes a conductor 249 which is connected to the double-exposure switch 120. This energizes the carriage motor in a forward direction since the circuit is completed through the double-exposure switch 120, the conductor 241, one or both of the parallel limit switches 236 and 237, and then through the forward limit switch 228. When the device reaches the forward end of its travel in any of its indexed positions, the forward limit switch 228 is broken to de-energize the carriage motor.

Whenever the push button advance switch 246 is depressed, the circuit for the grid motor 210 is energized. This grid motor energizing circuit is from the contact 245 through the conductor 249 and thence conductor 250 to the grid contact 223. The grid motor is connected to the contact 223 by another conductor 251 while the motor is connected to $L_2$ by a final conductor 252. The grid limit switch 209 is in this last conductor 252 so that if the grid is in a fully-retracted position, the grid motor will not operate.

Preferably magnetic locks are provided throughout the entire table and spot filmer assembly to lock the various parts in their adjusted position. It will be seen that these magnetic locks are automatically energized through the conductor 250 either whenever the advance switch 246 is depressed or when the eject switch 172 is depressed to energize the relay 217. Thus, the magnetic locks are energized whenever the conductor 250 is energized either by the contact 222 when the relay 217 is energized, or by the contact 245 when the advance switch 246 is depressed.

Similarly, an X-ray circuit is controlled by both the relay 217 and the push button advance switch 246. Whenever the push button advance switch 246 is depressed a contact 253 is closed to energize the X-ray circuit. Depressing of this switch will not energize this circuit, however, if the relay 217 is energized because the X-ray circuit contact 224 breaks the X-ray circuit whenever the relay 217 is energized.

OPERATION

When the device is used, the eject button 172 is first depressed to move the carriage to the load and unload position of FIGURE 3. The operator inserts a cassette by passing it rectilinearly through the front load opening 66 against the chutes 60, 61 to guide, the cassette into the cassette-supporting flanges 47, 48 on the jaws.

When the cassette is properly positioned in the carriage, the operator again depresses the eject switch 172. This breaks the circuit energizing the relay 217 and the load light 231, and allowing the device to automatically return to the position of FIGURE 15.

When the carriage has fully retracted to its parked position of FIGURE 15, the double exposure light 239 will continue to glow, serving at this time as a light to advise the operator that he must index the mechanism to a selected position. With the mechanism in the park position, he then rotates the selector knob 22 into a selected position. If it is one of the first six positions, this will open the limit switch 236; but again, if the cassette is of appropriate size, the limit switch 237 will be closed.

When the mechanism is fully retracted, the double exposure light 239 will remain on until the device has been indexed to a new position and the double exposure switch 120 is tripped from its position shown in the wiring diagram. Because of the double-exposure switch one cannot commence a cycle with the step next succeeding the last step of the preceding cycle, but rather must index the mechanism to an appropriate and desired position.

Once the selector knob 22 has been rotated to a desired position, the advance switch 246 is depressed and held throughout an exposure. This energizes the carriage motor 137 in a forward direction and causes the eccentric plate 135 to commence to rotate driving the eccentric link 133 and the connected travel link 130 forward. As the carriage begins to move forward, the cam follower disengagement cam 124 slides out of engagement with the followers permitting the followers 121, 122 to move into engagement with the travel control cams 97, 98. This action causes the track switch 190 to rotate to an indexed position and it simultaneously causes the cam travel arrest lever 155 to move to an appropriate position.

As the slide 128 moves forwardly, the travel control arm 139 will move forward with it dragging the longitudinal carriage travel control rack 143 forward until the rack travel control cam 145 has one of its stops in engagement with the cam travel arresting lever 155. Continued forward movement of the slide 128 causes rotation of the travel control arm 139 until the slide travel is completed and the forward limit switch 228 is open. Thereafter, an exposure is completed with the timing being accomplished either manually or through any of the known automatic systems. Finally, the advance button 246 is released causing the carriage to retract.

As the carriage retracts, the followers 121, 122 are again moved out of engagement with the travel control cams 97, 98 and the cross travel position lock pivots out of engagement with previously engaged ones of the travel position lock pins 51–53. The cross carriage then moves to a central position as the device is retracted and trigger tip 110 comes into engagement with the rearward end of the carriage. Continued rearward movement of the carriage then will pull the indexing trigger 109 rearwardly causing the pawl 105 to come rearwardly with it, advancing the ratchet cam 101 one notch. This advance of the ratchet cam 101 will cause forward movement of the indexing control rack 96. This forward movement of the indexing control rack 96 advances the travel control cams 97, 98 to the next position and simultaneously rotates the selector knob 22 so that it indicates the position which will be obtained upon the next depression of the advance switch 246.

The rearward travel continues until the eccentric plate 135 strikes the rearward travel stop 179 and the limit switch 248 breaks the reverse travel limit switch 248 and stops the motor. It should be noted here that when the motor is stopped in either the forward or reverse direction, the slip clutch plates 136 permit the motor to continue to rotate under its own inertia thereby allowing it to gradually come to a stop without any danger of damage to either gear teeth or the motor.

This cycling is repeated until a selected radiographic series of exposures have been made. Thereafter the final rotation of the ratchet cam 101 will cause the double exposure switch to be tripped lighting the double exposure light 239 and advising the operator that his sequence has been completed. Additionally, the movement of the double-exposure switch 120 breaks the forward control circuit of the carriage motor 137, preventing the device from being advanced to an exposure position until the selector knob is rotated to adjust the device to a new sequence. Finally, the eject button is depressed to return the carriage to the load position and the cassette lock release button 80 is depressed to eject the cassette and its exposed film.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A spot filmer comprising,
   (A) a frame;
   (B) a carriage mounted on the frame for longitudinal reciprocal movement;
   (C) a cross carriage mounted on the carriage for reciprocal movement transversely with respect to the frame;
   (D) power means mounted on the frame and connected to the carriage by a drive means to cause such reciprocal movement of the carriage;
   (E) other means for selectively causing transverse movement of the cross carriage on the carriage and retaining the cross carriage in a selected position;
   (F) said drive means including a slide reciprocally mounted on a track for reciprocation along a path generally paralleling the path of carriage reciprocation, said drive means also including an arm pivotally mounted on the slide and connected to the carriage to transmit force from the power means to the carriage; and
   (G) position control settable means for controlling the amount of pivotal movement of the arm relative to the slide each time the slide is moved along the track by other elements of the drive means.

2. A spot filmer comprising;
   (A) a frame;
   (B) a carriage reciprocatably mounted in the frame for longitudinal rectilinear movement;
   (C) a cross carriage mounted on the carriage for reciprocal movement transversely with respect to the frame;
   (D) power means mounted on the frame and connected to the carriage by a drive means to cause such reciprocal movement of the carriage;
   (E) a plurality of tracks and a track switch on the frame;
   (F) said track switch being selectively orientable with the tracks one at a time selectively causing transverse movement of the cross carriage on the carriage;
   (G) said drive means including a slide mounted on a slide reciprocally track for reciprocation along a path generally paralleling the path of carriage reciprocation, said drive means also including an arm pivotally mounted on the slide and connected to the carriage to transmit force from the power means to the carriage;
   (I) position control settable means for controlling the amount of pivotal movement of the arm relative to the slide each time the slide is moved along the slide track by other elements of the drive means and for controlling the orientation of the track switch; and,
   (J) a follower on the cross carriage for engaging the tracks whereby to shift the cross carriage laterally on the carriage according to the position of the track switch.

3. A spot filmer comprising;
   (A) a frame;
   (B) a carriage reciprocatably mounted in the frame for longitudinal rectilinear movement;
   (C) a cross carriage mounted on the carriage for reciprocal movement transversely with respect to the frame;

(D) means for selectively causing transverse movement of the cross carriage on the carriage during selected reciprocations of the carriage;

(E) a slide track on the frame and a slide mounted on the track;

(F) an arm pivotally mounted on the slide and connected to the carriage;

(G) a motor and an eccentric linkage carried by the frame connected to the slide and arm for causing selective reciprocating movement of the slide thereby driving said carriage;

(H) a rack reciprocatively mounted on the frame;

(I) said arm including a gear segment in engagement with the rack; and, (J) settable position control means for controlling the amount of reciprocatable movement of the rack thereby controlling the amount of pivotal movement of the arm relative to the slide each time the slide is moved along the track.

4. In a spot filmer including a front load opening and a carriage adapted for positioning adjacent the load opening and movably mounted on a frame, the combination of, (a) cams carried by the frame for controlling the movement of the movable carriage;

(b) settable means on the frame for controlling the position of the cams;

(c) other means for sequentially advancing the cams automatically during movement of the carriage through an exposure sequence;

(d) cam followers connected to the frame for engaging said cams and controlling said carriage movement; and, (e) follower release means actuated by said carriage movement for shifting the followers out of engagement with the cams whenever the carriage is moved to a park position whereby to facilitate movement of the cams.

5. The device of claim 4 wherein the other means advances the cams only when the followers are out of engagement wtih the cams.

6. In a spot filmer including a front load opening and a carriage adapted for positioning adjacent the load opening and movably mounted on a frame, the combination of, (a) elongated cams reciprocatably mounted on the frame for controlling the movement of the movable carriage, (b) settable means on the frame for controlling the position of the cams, (c) other means triggered by the carriage for sequentially advancing the cams automatically during the movement of the carriage through an exposure sequence, (d) tracks on the frame for guiding the carriage with one of the tracks being movable, (e) first follower linkage connected to the movable track for controlling the position of the movable tracks, (f) drive means connected to the carriage to selectively move the carriage relative to the frame, (g) a second follower linkage connected to the drive means to control the amount of carriage movement, (h) cam followers on the follower linkages for engaging said cams and controlling said carriage movement, (i) biasing means urging the followers into engagement with the cams; and, (j) follower release means actuated by said carriage movement for shifting the followers out of engagement with the cam whenever the carriage is moved to a park position whereby to facilitate movement of the cams.

7. The device of claim 6 wherein said follower release means comprises a pair of hook-like cams on the carriage.

8. The device of claim 7 wherein said other means includes a ratchet, a pawl for advancing the ratchet and a carriage actuatable trigger connected to the pawl.

9. The device of claim 8 wherein the trigger is actuated by movement of the carriage to the park position after the followers have been shifted out of engagement with the cams.

10. The device of claim 8 wherein the ratchet is rotatable about an axis and a detent is provided and wherein the detent is biased along an axis paralleling the ratchet rotation.

11. In a spot filmer having a frame with a front load opening and a carriage movably mounted on the frame, the combination of:

(a) drive means interposed between the frame and the carriage for guiding the carriage through a selected one of a group of radiographic exposure sequences and selectively into a load position adjacent the front load opening, (b) a cross carriage mounted on the carriage for transverse movement;

(c) jaw means on the cross carriage for retentively gripping a cassette;

(d) lock means between the carriage and the cross carriage for locking the two against relative movement in each position in each such exposure sequence; and, (e) means to prevent the retraction of the carriage from the load position whenever a cassette is improperly positioned in a cross carriage.

12. The device of claim 11 wherein a sensing protection means is connected to the drive means for preventing actuation of the drive means whenever a cassette too large for a selected exposure is in the carriage.

13. In a spot filmer having a frame with a front load opening and a carriage movably mounted on the frame, the combination of, (a) drive means interposed between the frame and the carriage for guiding the carriage through a selected one of a group of radiographich exposure sequences and selectively into a load position adjacent the front load opening, (b) a cross carriage mounted on the carriage for transverse movement, (c) jaw means on the cross carriage for retentively gripping a cassette;

(d) lock means between the carriage and the cross carriage for locking the two against relatively movement in each position in each such exposure sequence;

(e) a radiation shield movably carried on the spot filmer frame and positioned near said opening, (f) means normally maintaining the shield across the load opening; and, (g) means on said carriage for shifting the shield to a storage position upon movement of the carriage to a load position, 14. The device of claim 11 wherein the drive means comprises, (a) a reversible power means connected to the carriage for shifting the carriage from a park position to selected positions and return; and (b) bidirectional slip clutch means for absorbing inertia of the power means in both directions.

15. The device of claim 11 wherein the drive means comprises, (a) an electric motor mounted on the frame, (b) a drive linkage interposed between the motor and the carriage for shifting the carriage through an exposure sequence, (c) said linkage including a drive link pivotal about an axis; and, (d) a slip clutch means between the motor and the drive link to drive the link in both directions about the pivot and permit the continued rotation of the motor in either direction after pivotal movement of the drive link has terminated.

16. The device of claim 15 wherein the slip clutch includes a pair of plates on opposite sides of the drive link and biased toward one another and against the plate.

17. In a spot filmer having a front load opening and a carriage movably mounted on a frame, the combination of,
   (a) a cross carriage mounted on the carriage for transverse movement;
   (b) cams carried by the frame for controlling the movement of the carriages;
   (c) settable means on the frame for controlling the position of the cams;
   (d) other means for sequentially advancing the cams automatically during movement of the carriages through an exposure sequence;
   (e) cam followers connected to the frame for engaging said cams and controlling said carriage movement;
   (f) follower release means actuated by said carriage movement for shifting the followers out of engagement with the cam whenever the carriage is moved to a park position whereby to facilitate movement of the cam;
   (g) drive means interposed between the frame and the carriage for guiding the carriage through a selected one of a group of radiographic exposure sequences and selectively into a load position adjacent the front load opening;
   (h) jaw means on the cross carriage for retentively gripping a cassette; and,
   (i) lock means between the carriage and the cross carriage for locking the two against relative movement in each position in each such exposure sequence.

18. A spot filmer comprising,
   (a) a frame defining a front load opening;
   (b) a carriage mounted on the frame for longitudinal reciprocal movement to a load position adjacent the opening and to other positions;
   (c) a cross carriage mounted on the carriage for reciprocal movement transversely with respect to the frame;
   (d) drive means mounted on the frame and connected to the carriage to cause such reciprocal movement of the carriage;
   (e) other means for selectively causing transverse movement of the cross carriage on the carriage;
   (f) said drive means including a slide mounted on a track, an arm pivotally mounted on the slide;
   (g) position control settable means for controlling the amount of pivotal movement of the arm relative to the slide each time the slide is moved along the track by other elements of the drive means; and,
   (h) means to prevent the retraction of the carriage from the load position whenever a cassette is improperly positioned in a cross carriage.

19. The device of claim 18 wherein a sensing protection means is connected to the drive means for preventing actuation of the drive means whenever a cassette too large for a selected exposure is in the carriage.

20. A spot filmer comprising,
   (a) a frame defining a front load opening;
   (b) a carriage mounted on the frame for longitudinal reciprocal movement to a load position adjacent the opening and to other positions;
   (c) a cross carriage mounted on the carriage for reciprocal movement transversely with respect to the frame;
   (d) drive means mounted on the frame and connected to the carriage to cause such reciprocal movement of the carriage;
   (e) other means for selectively causing transverse movement of the cross carriage on the carriage;
   (f) said drive means including a slide mounted on a track, an arm pivotally mounted on the slide;
   (g) position control settable means for controlling the amount of pivotal movement of the arm relative to the slide each time the slide is moved along the track by other elements of the drive means;
   (h) a radiation shield movably carried on the spot filmer frame and positioned near said opening;
   (i) means normally maintaining the shield across the load opening; and,
   (j) means on said carriage for shifting the shield to a storage position upon movement of the carriage to a load position.

21. The device of claim 18 wherein the drive means includes,
   (a) a reversible power means connected to the carriage for shifting the carriage from a park position to selected positions and return; and,
   (b) bidirectional slip clutch means for absorbing inertia of the power means in both directions.

22. In a spot filmer having a frame equipped with a front load opening, the combination of:
   (a) a carriage mounted on the frame for reciprocal longitudinal movement from a park position remote from the load opening to a load positioning adjacent the load opening and to exposure positions between the park and load positions;
   (b) a cross carriage mounted on the carriage for selective transverse movement from a center position to right and left positions one at a time;
   (c) drive means connected to the frame and to the carriage for selectively shifting the carriage to a selected one of its longitudinally spaced positions;
   (d) track means on the frame and engageable with the cross carriage for shifting the cross carriage to a selected one of its transverse positions;
   (e) said track means including a track switch movably mounted on the frame and selectively positionable for guiding the cross carriage into a selected one of its transverse positions, said switch having a central position;
   (f) settable means on the frame for controlling the position of the track switch and including an operative connection with the track switch;
   (g) disabling means on the cross carriage for selectively disconnecting the operative connection;
   (h) biasing means urging the switch into its central position; and,
   (i) a manually actuated eject mechanism mounted on the frame and actuatable to cause the carriage to move from its park position to its load position, said mechanism including a lock connectable with the switch to maintain the switch in its central position whenever the mechanism is actuated.

23. The device of claim 22 wherein the lock includes an arm moveably mounted on the frame and wherein the arm and switch include a coactable projection and notch to effect the locking when the mechanism is actuated.

24. The device of claim 22 wherein:
   (a) the settable means is operably connected to the drive means to control longitudinal movement; and,
   (b) the mechanism, when actuated, disables the operable connection of the settable means and the drive means.

25. In a spot filmer having a frame equipped with a front load opening, the combination of:
   (a) a carriage mounted on the frame for reciprocal longitudinal movement from a park position remote from the load opening to a load positioning adjacent the load opening and to exposure positions between the park and load positions;
   (b) a cross carriage mounted on the carriage for selective transverse movement from a center position to right and left positions one at a time;

(c) drive means connected to the frame and to the carriage for selectively shifting the carriage to a selected one of its longitudinally spaced positions;

(d) a track mounted on the frame including spaced tracks engageable with the cross carriage for shifting the cross carriage to a selected one of its transverse positions;

(e) a track follower on the cross carriage coactable with said tracks;

(f) a track switch pivotally mounted on the frame and selectively positionable for guiding the cross carriage follower into coacting engagement with a selected one of the tracks to move the cross carriage to a selected one of its transverse positions, said switch having a central position;

(g) settable means on the frame for controlling the position of the switch and including a cam and cam follower forming an operative connection with the track switch;

(h) a follower trip on the cross carriage for selectively disconnecting the operative connection of the cam and cam follower;

(i) springs urging the switch into its central position; and, (j) a manually actuated eject mechanism mounted on the frame and actuatable to cause drive means to move the carriage from its park position to its load position, said mechanism including a lock connectable with the switch to maintain the switch in its central position whenever the mechanism is actuated.

26. In a spot filmer having a frame with a front load opening and a carriage movably mounted on the frame, the combination of:

(a) drive means interposed between the frame and the carriage for guiding the carriage through a selected one of a group of radiographic exposure sequences and selectively into a load position adjacent the front load opening;

(b) a cross carriage mounted on the carriage for transverse movement;

(c) jaw means on the cross carriage for retentively gripping a cassette;

(d) means operatively connected to the carriage and the cross carriage for preventing relative movement of the carriage and the cross carriage in each position in each such exposure sequence; and, (e) means to prevent the retraction of the carriage from the load position whenever a cassette is improperly positioned in the cross carriage.

27. The device of claim 26 wherein:

(a) a radiation shield is movably carried on the spot filmer frame and positioned near said opening;

(b) a means is provided which normally maintains the shield across the load opening; and, (c) another means is on said carriage for shifting the shield to a storage position upon movement of the carriage to a load position.

References Cited in the file of this patent

UNITED STATES PATENTS

| | | |
|---|---|---|
| 2,056,279 | Kulick | Oct. 6, 1936 |
| 2,331,586 | Waisco | Oct. 12, 1943 |
| 2,552,858 | Mueller et al. | May 15, 1951 |
| 2,834,890 | Bastin et al. | May 13, 1958 |
| 2,858,445 | Kizaur et al. | Oct. 28, 1958 |
| 2,892,089 | Guentner et al. | June 23, 1959 |
| 2,921,202 | Berger et al. | Jan. 12, 1960 |
| 2,924,717 | Koerner et al. | Feb. 9, 1960 |